United States Patent
Long

(10) Patent No.: US 9,378,230 B1
(45) Date of Patent: Jun. 28, 2016

(54) ENSURING AVAILABILITY OF DATA IN A SET BEING UNCORRELATED OVER TIME

(71) Applicant: Amazon Technologies, Inc., Reno, NV (US)

(72) Inventor: Brian Gregory Long, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 14/028,334

(22) Filed: Sep. 16, 2013

(51) Int. Cl.
*G06F 17/30* (2006.01)

(52) U.S. Cl.
CPC ................................ *G06F 17/30312* (2013.01)

(58) Field of Classification Search
None
See application file for complete search history.

(56) References Cited

U.S. PATENT DOCUMENTS

| | | | |
|---|---|---|---|
| 6,578,005 B1 | 6/2003 | Lesaint et al. | |
| 8,874,755 B1 * | 10/2014 | Deklich et al. | 709/226 |
| 2003/0210694 A1 | 11/2003 | Jayaraman et al. | |
| 2005/0050553 A1 | 3/2005 | Hen et al. | |
| 2005/0193179 A1 * | 9/2005 | Cochran et al. | 711/162 |
| 2007/0250631 A1 | 10/2007 | Bali et al. | |
| 2008/0228755 A1 * | 9/2008 | Haga et al. | 707/5 |
| 2009/0019535 A1 | 1/2009 | Mishra et al. | |
| 2010/0274816 A1 | 10/2010 | Guzik | |
| 2010/0274885 A1 | 10/2010 | Yoo et al. | |
| 2010/0274890 A1 | 10/2010 | Patel et al. | |
| 2010/0299437 A1 | 11/2010 | Moore | |
| 2011/0072437 A1 | 3/2011 | Druyan | |
| 2011/0126207 A1 | 5/2011 | Wipfel et al. | |
| 2011/0191477 A1 | 8/2011 | Zhang et al. | |
| 2011/0296104 A1 * | 12/2011 | Noda et al. | 711/114 |
| 2012/0059934 A1 | 3/2012 | Rafiq et al. | |
| 2012/0191724 A1 * | 7/2012 | Tucek et al. | 707/747 |
| 2013/0297802 A1 | 11/2013 | Laribi et al. | |
| 2013/0332484 A1 | 12/2013 | Gajic | |
| 2014/0031075 A1 | 1/2014 | Ramiah et al. | |
| 2014/0122926 A1 | 5/2014 | Bartholomy et al. | |
| 2014/0245298 A1 | 8/2014 | Zhou et al. | |
| 2015/0039645 A1 * | 2/2015 | Lewis | 707/769 |

\* cited by examiner

*Primary Examiner* — Khanh Pham
(74) *Attorney, Agent, or Firm* — Davis Wright Tremaine LLP

(57) ABSTRACT

A computing resource monitoring service receives an executable command to redundantly store a metric pertaining to computing resources provided to the customer by a computing resource service provider. The executable command may comprise a hash key and a hash value for the metric. Based on the hash key included in the executable command, the computing resource monitoring service may select one or more data zones, each of the data zones comprising one or more storage nodes for storing metrics. The computing resource monitoring service may be configured to obtain a schedule of storage nodes from the data zones in order to determine the active storage nodes based at least in part on the hash key. Accordingly, the computing resource monitoring service may identify a storage node from the one or more active nodes based at least in part on the hash key and store the metric in the identified node.

25 Claims, 13 Drawing Sheets

ENSURING AVAILABILITY OF DATA IN A SET BEING UNCORRELATED OVER TIME

CROSS REFERENCE TO RELATED APPLICATIONS

This application is subject matter related to U.S. patent application Ser. No. 14/028,297, filed Sep. 16, 2013, entitled "DATA RECONCILIATION IN A DISTRIBUTED DATA STORAGE NETWORK," the content of which is incorporated by reference herein in its entirety.

BACKGROUND

Computing resource monitoring systems have evolved and continue to evolve to keep up with the demands of the organizations that use them. Many organizations, for example, utilize computing resource monitoring systems for, among other reasons, evaluating one or more metrics associated with resources and applications that the organizations may utilize to support their businesses. Despite their many advantages, many modern computing resource monitoring systems are prone to data corruption or defects resulting in reduced availability of the data and potential data loss. For example, if a storage node within a computing resource monitoring system is damaged or rendered unavailable, the data stored within may accordingly become unavailable and, without redundancy, may be lost. Currently, many modern computing resource monitoring systems utilize a horizontal partition to store one or more metrics that, if lost, may result in any metrics that reside within the partition being unavailable for all reads and writes at any point in time. Additionally, these modern computing resource monitoring systems may be configured to monitor one or more services that may be automatically scaled according to customer and system demands. This, in turn, could exacerbate the impact of any unavailability of metrics associated with the resources and applications supported by the computing resource monitoring service. Adequately addressing these issues, such as through provisioning additional resources to adequately provide data redundancy in the event of one or more unavailable storage nodes, presents additional costs to the organizations that rely on the computing resource monitoring systems and the computing resource service provider that may provide the computing resource monitoring service to its customers.

BRIEF DESCRIPTION OF THE DRAWINGS

Various embodiments in accordance with the present disclosure will be described with reference to the drawings, in which.

DETAILED DESCRIPTION

Figure 1:
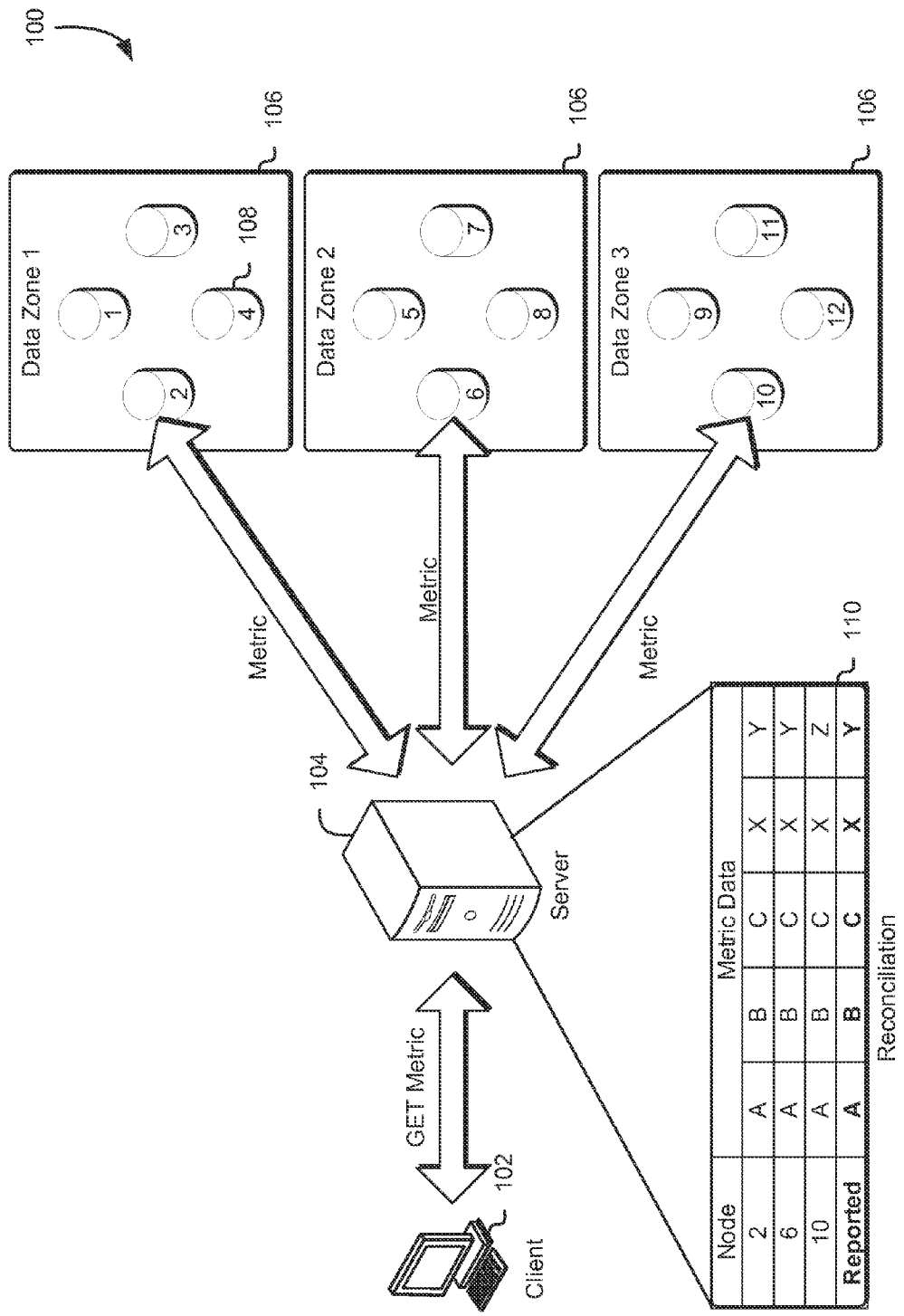
FIG. 1 is an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the storage of metrics data while ensuring availability of the metrics data in the event of uncorrelated failures. In an embodiment, an entity (e.g., an organization) may communicate with a computing resource monitoring service, such as through appropriately configured application programming interface (API) calls to the service, to request persistent storage of one or more metrics pertaining to computing resources or applications provided to the customer by a computing resource service provider. The entity may be a customer of a computing resource service provider that operates various services such as data storage services, virtual computer system services and/or computing resource monitoring services. Alternatively, the API calls to the service may originate from the computing resources or customer applications provided by the computing resource service provider to the entity. For instance, an existing virtual machine instance associated with an entity may be configured to track performance data in the form of one of more metrics. The values associated with these metrics may be transmitted to the computing resource monitoring service for storage and later customer use. The API calls to the service may be in the form of a PUT or GET command for storing or retrieving, respectively, one or more metrics in the computing resource monitoring service, respectively. Different embodiments may include third party capabilities for storing metrics data within a computing resource monitoring service.

In various embodiments, the metrics may be persistently stored in one or more storage nodes within one or more data zones. These data zones may be operated by the computing resource service provider in one or more geographical regions. For instance, each geographical region managed and operated by the computing resource service provider may comprise a number of isolated locations (e.g., data zones). A customer or other entity may be able to access these data zones through one or more services provided by the computing resource service provider. For instance, a customer may use a customer interface to access a virtual machine instance hosted in a particular data zone. Alternatively, a computing resource or customer application may be configured to communicate with the customer interface in order to access these data zones on the customer's behalf. Through a customer interface, a customer or a computing resource operating on the customer's behalf may be able to interact with a datastore writer, which may be configured to write the metrics into one or more storage nodes within the distinct data zones.

In various embodiments, the computing resource monitoring service may be configured to persistently store metrics in one or more storage nodes within a data zone. The computing resource monitoring service may receive an API call from a client (e.g., a PUT command) to store a metric within the computing resource monitoring service. The client may be a computer system operated by a customer of the computing resource service provider, which may be hosted by the customer itself, by the computing resource service provider or by another entity. The PUT command may include a hash key comprising one or more metric attributes. For instance, the PUT command may include a fully qualified metric identifier (FQMI) which may be used to identify the metric to be stored and the proper storage location for the metric, time and replication factor. The metric may originate, for example, from a hypervisor that supports a virtual machine instance or by a process operating within the virtual machine instance. In addition, the PUT command may also include hash values for the metric to be stored. Accordingly, the computing resource monitoring service may extract the observation time and the FQMI of the metric to be stored in order to determine which storage node should be used to store the metric. For instance, the computing resource monitoring service may be configured to obtain a schedule of storage nodes active in a distributed hash table (DHT) over time. This time may be relative to the observation time of the metric as opposed to the wall clock time. Thus, for a given observation time, the metric may be written to a particular storage node that stores data for one or more metric time logical data containers corresponding to a set time range. Each metric time logical container may serve as an identifier for the metrics stored within the storage node based at least in part on the observation time of the metric. Each metric time logical data container may correspond to an observation time range for the metric. For instance, a metric time logical data container may correspond to a fifteen minute time interval for observations. If a subsequent request to store a metric comprising a later observation time is processed, this metric may be stored in a different storage node corresponding to an observation time range related to the observation time of the metric.

In an embodiment, the datastore writer within the computing resource monitoring service may be configured to map one logical write operation to multiple physical operations against varying replicas (e.g., distinct data zones). As noted above, the computing resource monitoring service may be configured to obtain a schedule of storage nodes active in a DHT over time. This DHT may be configured to be topologically aware of the various data zones and the associated storage nodes that comprise them. Accordingly, the datastore writer may be configured to use the DHT to ensure that each logical operation may be routed to one or more storage nodes in distinct data zones. The schedule of storage nodes within each data zone may be configured such that each time interval associated with the storage nodes partially but incompletely overlaps with at least one time interval for another storage node in a different, distinct data zone corresponding to the schedule for the different and distinct data zone. This may help ensure successful replication of metrics data with minimal disruption in the event of an uncorrelated failure of a storage node within a data zone.

In some embodiments, each storage node within the distinct data zones may comprise a variety of components which may be collectively configured to write metrics data to one or more metric time logical data containers and provide a response to metrics data queries (e.g., GET commands). For instance, a storage node may comprise an idempotency filter which may be configured to transmit any queries or requests for storage previously processed to a responder in order to provide a response to the query or request without having to refer to the metric time logical data containers within the storage node. Additionally, the storage node may comprise an aggregator which may be configured to compute a hash for the metric in order to store the metrics data for each metric time logical data container within the storage node. Each metric time logical data container may be used to identify the metrics data according to a time range corresponding to the measure time of the metrics data stored within the storage node. As noted above, the storage node may include a responder component, which may be configured to receive metrics data from the aggregator and metric time logical data containers based at least in part on a query for metrics data and to provide a response to the query (e.g., GET command). Additionally, the responder may be configured to transmit write acknowledgment after metrics data has been successfully stored within the storage node in response to a PUT command.

In an embodiment, the computing resource monitoring service may be configured to process one or more queries for metrics data, such as through an appropriately configured API call to the service (e.g., a GET command). The GET command may include a hash key, as described above, that may comprise the FQMI, a time range for observations desired and the replication factor. The computing resource monitoring service may be configured to obtain a time range from the hash key and the FQMI included in the GET command in order to identify the storage nodes comprising metrics data necessary to fulfill the query. As noted above, the computing resource service provider may persistently store metrics data in one or more storage nodes in one or more distinct data zones. Accordingly, the computing resource monitoring service may be configured to obtain a schedule of the storage nodes in each of the data zones to locate the metrics data within the distinct data zones. Once the metrics data has been obtained from the distinct data zones within the computing resource monitoring service, the service may transmit these responses to the customer in order to fulfill the query.

In an embodiment, the computing resource monitoring service may be configured to evaluate the one or more responses to a GET command, received from the distinct data zones, to determine whether the one or more responses satisfy one or more agreement criteria. For instance, if the one or more responses fail to satisfy the agreement criteria, the computing resource monitoring service may perform a reconciliation process in order to generate a reconciled response that may provide a greater degree of accuracy. The reconciliation process may include applying one or more heuristics based on the type of metric queried in order to reconcile the responses from the distinct data zones. Accordingly, the computing resource monitoring service may fulfill the customer query (e.g., GET command) by providing this reconciled response.

In this manner, the computing resource monitoring service may be able to persistently store metric observations and support customer queries for these observations while reducing the impact resulting from the unavailability of a storage node or data zone. In addition, the techniques described and suggested herein facilitate additional technical advantages. For example, because the computing resource monitoring service may be configured to perform a reconciliation process based at least in part on a failure of one or more responses to meet certain agreement criteria, the computing resource monitoring service may be able to provide a response to a query with a greater likelihood of accurate results even if one or more responses comprise errors or missing metrics data. This, in turn, may obviate the increased cost of reproducing metrics data or provisioning additional equipment to provide consistent backup storage of the metrics data. Additional uses are also enabled by the various techniques described herein.

FIG. 1 shows an illustrative example of an environment 100 in which various embodiments may be practiced. In the environment 100, a client 102 may transmit one or more requests for storage of metrics data within a computing resource monitoring service. The client 102 may be a computer system operated by a customer of the computing resource service provider, which may be hosted by the customer itself, by the computing resource service provider or by another entity. A customer may be an organization that could utilize one or more services provided by a computing resource service provider to monitor one or more computing resources or applications provided by the computing resource service provider to the customer. For instance, the customer may use the client 102 to interact with a front-end server 104 provided by the computing resource service provider to transmit one or more appropriately configured API calls to the service (e.g., a PUT command, as illustrated in FIG. 1) to store one or more metrics data within a computing resource monitoring service. The front-end server 104 may be configured to process the PUT command transmitted by the client 102 and perform one or more actions with regard to the metrics data to be stored within the computing resource monitoring service. For instance, the server 104 may comprise a datastore writer which may extract a timestamp from the PUT command in order to determine a proper storage location. Additionally, the datastore writer may be configured to extract a replication factor from the PUT command to determine how many replicas of the metric should be generated and stored. Thus, the server 104 may be designed to operate within a temporally and topologically aware DHT in order to persistently store the metrics data according to a replication process.

In order to ensure that the replication process is achieved, the server 104 may be configured to persistently store the metrics data in one or more data zones 106. For instance, the replication process may be achieved by mapping a write operation (e.g., operation resulting from a PUT command) to multiple physical operations against varying replicas. A replica may be an exact copy of the metrics data, created to provide redundancy of metrics data. Each of the multiple physical operations may be routed to each of the available data zones 106 included in the computing resource monitoring service. Thus, if a data zone 106 were to become unavailable, the server 104 may be able to retrieve a replica of the metrics data from the other available data zones, allowing for greater availability of metrics data.

Each data zone 106 may comprise one or more storage nodes 108 which may be used to persistently store the metrics data received from a customer 102. As will be illustrated in greater detail in connection with FIG. 5, each storage node 108 may comprise one or more metric time logical data containers. The metric time logical data containers may be configured to serve as an identifier for the metrics data persistently stored within the storage node 108 such that the metrics data may be organized according to the observation time of the metrics data. Metrics data stored in association with an identifier of a logical data container can be said to be stored in the logical data container. For instance, each metric time logical data container may correspond to a ten-minute interval for which metrics data comprising data within that ten-minute interval may be identified. As noted above, the server 104 may be designed to operate within a temporally and topologically aware DHT in order to persistently store the metrics data according to a replication process. Accordingly, the metrics data may be routed to a continually changing set of storage nodes 108 over time. For instance, a storage node 108 may comprise one or more metric time logical data containers configured to serve as an identifier for the metrics data that may include a timestamp within a certain time range. Thus, if the timestamp within the metrics data corresponds to a time outside of the time range, the server 104 may transmit the metric to a datastore writer which may be configured to store the metrics data in a different storage node 108 within the data zones 106.

If a storage node 108 is compromised (e.g., unavailable, damaged, or defective), the computing resource monitoring service may be configured to remove this storage node from any future schedules generated. Since the data zones 106 and storage nodes 108 may comprise a temporally and topologically aware DHT, after a certain amount of time, the compromised storage node 108 may be removed from future writes to the data zone and metrics data may be written to a new storage node 108 that may replace the compromised node. Thus, PUT requests may be routed to a continually changing set of replicas over time that may result in a statistically guaranteed upper bound for the duration of a replica outage. Additionally, the storage nodes 108 within a data zone 106 may be configured such that the storage nodes partially but incompletely overlap temporally with at least another storage node in a different data.

For example, when storage nodes are correlated (i.e., the metrics data may be sent to a set of storage nodes 106 within one or more data zones 108), the storage nodes 106 may become uncorrelated after a certain amount of time. For example, if at a time T1 metrics data is persistently stored within storage nodes {A,B,C} in data zones {1,2,3}, respectively, at a later time T2, the metrics data may also be stored within storage nodes {A,B,C} in data zones {1,2,3}. However, at an even later time T3, the metrics data may now be stored within storage nodes {A,B,D} instead of storage nodes {A,B,C} in data zones {1,2,3}. This uncorrelated storage may continue throughout time such that at a time T4, metrics data may be then stored within storage nodes {A,F,D} in data zones {1,2,3}, ad infinitum. This may help ensure successful replication of metrics data with minimal disruption in the event of an uncorrelated failure of a storage node 108 within a data zone 106.

Figure 2:
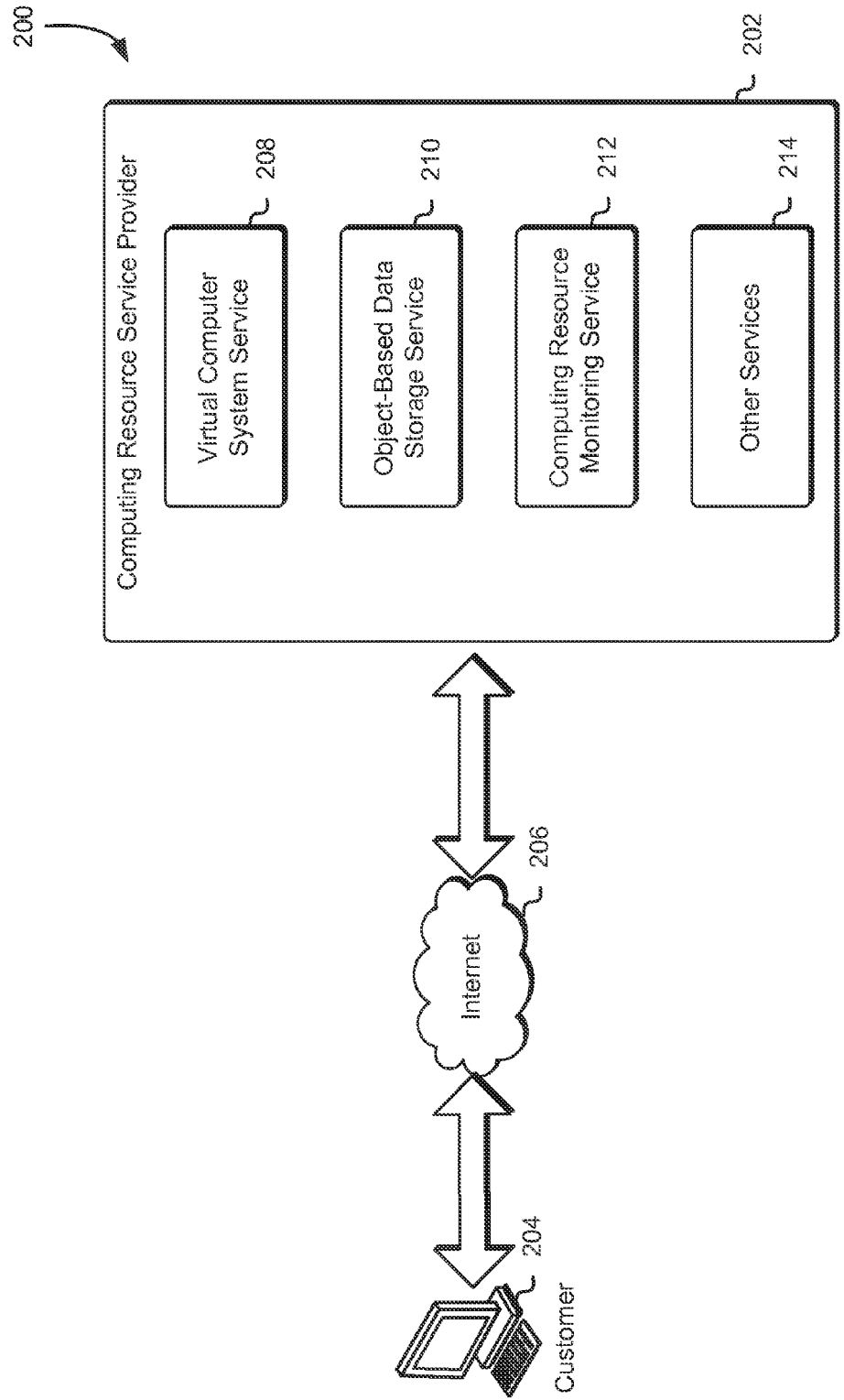
FIG. 2 is an illustrative example of an environment in which various embodiments can be implemented.

As noted above, the customer may utilize one or more services provided by the computing resource service provider in order to operate and monitor computing resources and application provided by the computing resource service provider. Accordingly, FIG. 2 is an illustrative example of an environment 200 comprising the one or more services provided by a computing resource service provider 202. In the environment 200, a computing resource service provider 202 may provide a variety of services to a customer 204. The customer 204 may be an organization that may utilize the various services provided by the computing resource service provider 202 to operate and support one or more database applications or services for its own customers. Additionally, the customer 204 may be an individual that could utilize the various services to persistently store information generated in performing a task. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. For instance, in this particular illustrative example, the computing resource service provider 202 provides at least three types of services. The services provided by the computing resource service provider, in this example, include a virtual computer system service 208, an object-based data storage service 210, a computing resource monitoring service 212 and one or more other services 214, although not all embodiments of the present disclosure will include all such services and additional services may be provided in addition to or as an alternative to services explicitly described herein.

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service to provision and operate virtual computer systems that are instantiated on physical computing devices hosted and operated by the computing resource service provider 202. The virtual computer systems may be used for various purposes, such as to operate as servers supporting a website. Other applications for the virtual computer systems may be to support database applications, electronic commerce applications, business applications and/or other applications.

The object-based data storage service 210 may comprise a collection of computing resources that collectively operate to store data for a customer 204. The data stored in the object-based data storage service 210 may be organized into data objects. The data objects may have arbitrary sizes except, perhaps, for certain constraints on size. Thus, the object-based data storage service 210 may store numerous data objects of varying sizes. The object-based data storage service 210 may operate as a key value store that associates data objects with identifiers of the data objects which may be used by the customer 204 to retrieve or perform other operations in connection with the data objects stored by the data storage service 210. Access to the data storage service may be through appropriately configured API calls.

The computing resource monitoring service 212 may comprise a plurality of computing resource components collectively configured to provide persistent retention of metrics data. Accordingly, the computing resource monitoring service 212 may include a datastore writer configured to obtain metrics data from a customer and persistently store the metrics data in one or more storage nodes. The storage nodes may be included in one or more distinct data zones in order to support replication of metrics data in response to an API call to the service for the persistent storage of metrics data (e.g., a PUT command). The replication process may be achieved by mapping one or more logical write or read operations to multiple physical operations against varying replicas. Since the design of the one or more servers comprising the computing resource monitoring service 212 is such that it may include a temporally and topologically aware DHT, each logical operation may be routed to a storage node in a distinct data zone to support the replication process. Additionally, requests may be routed to a continually changing set of replicas over time, which may limit the duration of a replica set outage should all storage nodes for a given metric/time become unavailable.

The computing resource monitoring service 212 may additionally include a datastore reader, which be configured to process one or more queries (e.g., GET commands) in order to retrieve one or more metrics data stored within the storage nodes in the distinct availability zones. The datastore reader may additionally be configured to apply agreement criteria to the responses to the query such that a response may be provided if the agreement criteria are met. However, should the responses not satisfy the agreement criteria, the datastore reader may perform a reconciliation process in order to return what may be the most accurate response. For instance, the reconciliation process may include applying one or more heuristics to select or compile a response based at least in part on the one or more responses received from the storage nodes included in the distinct data zones.

The computing resource service provider 202 may additionally maintain one or more other services 214 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, block-level data storage services, object-level archival data storage services, services that manage other services and/or other services.

Figure 3:
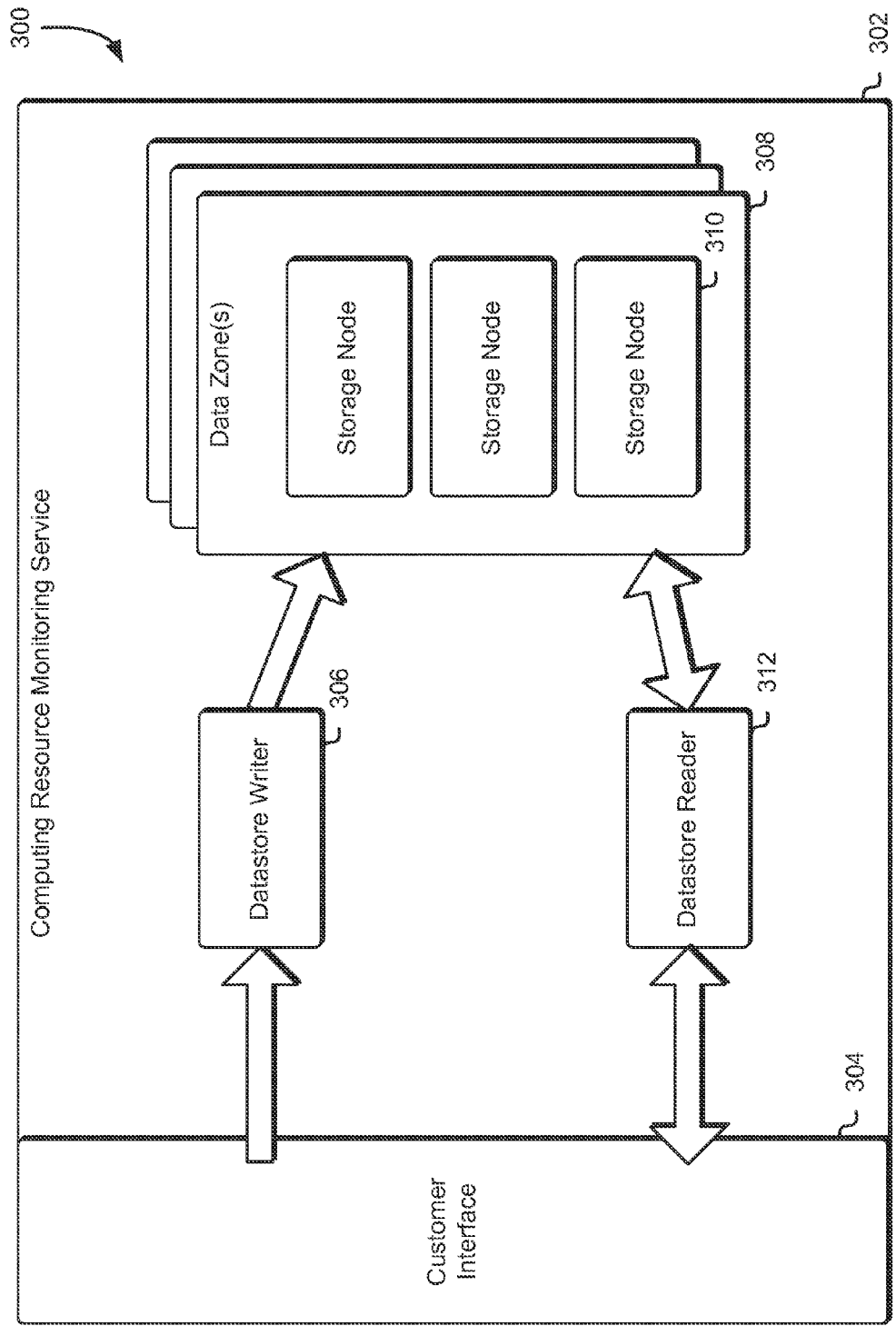
FIG. 3 is an illustrative example of an environment in which various embodiments can be implemented.

As noted above, the computing resource monitoring service may comprise a variety of components which may collectively be configured to process read and write requests from a customer. Accordingly, FIG. 3 is an illustrative example of an environment 300 that includes the various components that may comprise the computing resource monitoring service 302. As noted above, a customer may utilize the computing resource monitoring service 302 in order to persistently store metrics data related to one or more computing resources of applications provided by a computing resource service provider to the customer. Accordingly, the computing resource monitoring service 302 may provide a customer with a customer interface 304 to access the computing resource monitoring service 302. A customer may utilize the customer interface 304 through one or more communications networks, such as the Internet. The customer interface 304 may comprise certain security safeguards to ensure that the customer has authorization to access the computing resource monitoring service 302. For instance, in order to access the computing resource monitoring service 302, a customer may need to provide a username and a corresponding password or encryption key when using the customer interface 304. Additionally, requests (e.g., API calls) submitted to the customer interface 304 may require an electronic signature generated using a cryptographic key such that the electronic signature is verifiable by the computing resource monitoring service 302, such as by an authorization system (not shown).

The customer may utilize the customer interface 304 to customize the type of data that may be produced in tracking one or more metrics statistics. For example, a customer may specify, through the customer interface 304, that it is preferable to track the central processing unit (CPU) utilization for a given application that the customer is currently using to support the customer's business. Alternatively, one or more computer systems operated by the customer, computing resource service provider or another entity (e.g., clients) may be configured to transmit a PUT or GET command through the customer interface 304 in order to store or retrieve metrics data in the computing resource monitoring service 302, respectively. Other API calls transmitted through the customer interface 304 may be handled through a management sub-system (not shown). For example, a customer may use the customer interface 304 to generate one or more alarms based at least in part on a triggering event. For example, an alarm may be triggered if a metric value surpasses a metric threshold.

The customer interface 304 may be configured to transmit a PUT command to a datastore writer 306. The datastore writer 306 may be configured to obtain metrics data from all the various applications and computing resources provided by a computing resource service provider. Additionally, the datastore writer 306 may be configured to track metrics data according to customer requests, such as those received through a customer interface 304. The datastore writer 306 may be configured to persistently store the metrics data in one or more storage nodes 310 in one or more distinct data zones 308. Accordingly, the datastore writer 306 may additionally be configured to obtain a schedule of the storage nodes 310 within the one or more distinct data zones 308 in order to determine which storage nodes 310 may be used to store the metrics data. As noted above, the computing resource monitoring service 302 may be configured to perform a replication process in order to achieve enhanced metrics data durability and availability within the service.

As noted above, the computing resource monitoring service 302 may include one or more distinct data zones 308 for storing metrics data. The computing resource monitoring service 302 may maintain these distinct data zones 308 in order to support the replication process. For instance, a client may utilize the customer interface 304 to transmit a PUT command that includes a replication factor for the metrics data to be persistently stored within the computing resource monitoring service 302. This replication factor may correspond to the number of data zones 308 the datastore writer 306 may write the metrics data to. Accordingly, based on this replication factor, the datastore writer 306 may obtain the schedules from a number of distinct data zones 308, equal to the replication factor, in order to select one or more storage nodes 310 in which to store the metrics data.

As noted above, each distinct data zone 308 may comprise one or more storage nodes 310 which may be configured to persistently store the metrics data. As will be illustrated in connection with FIG. 5, a storage node 310 may include a variety of components for processing read or write requests (e.g., GET or PUT commands, respectively) from both the datastore writer 306 and the datastore reader 312. For instance, a storage node 310 may include an idempotency filter which may be configured to determine whether a request targeting the storage node has been fulfilled in the past. Accordingly, a storage node 310 may be configured to provide a response to a request by referring to past request responses and providing a stored response without performing any additional actions. Additionally, a storage node 310 may comprise one or more metric time logical data containers which may be configured to associate the metrics data according to the time relative to the measure of time of the observations that comprise the metrics data. Each metric time logical data container may correspond to a time range such that metrics data with a certain timestamp may be stored in storage node 310 and identified according to a time within that time range.

The customer may additionally utilize the customer interface 304 to submit one or more queries (e.g., GET commands) for metrics data. For example, a customer may submit a query, through the customer interface 304, that includes a request for metrics data associated with the central processing unit (CPU) utilization for a given application that the customer is currently using to support the customer's business. Additionally, this query may include a time range for which the customer desires to review metrics data. Accordingly, the customer interface 304 may be configured to transmit this query to a datastore reader 312. The datastore reader 312 may be configured to refer to each distinct data zone 308 to obtain a schedule of storage nodes 310 within these data zones in order to identify which storage nodes may comprise the metrics data necessary to fulfill the query. Once the datastore reader 312 has obtained the responses from the one or more distinct data zones 308, the datastore reader may apply agreement criteria to the responses to determine whether the responses meet the criteria.

If the obtained responses satisfy the agreement criteria, the datastore reader 312 may transmit a response to the customer interface 304 in order to fulfill the query. However, if the responses do not meet the agreement criteria, the datastore reader 312 may perform a reconciliation process in order to generate an appropriate response to the query. For instance, the datastore reader 312 may be configured to apply one or more heuristics to the responses to generate what may be the most accurate response to the query. For example, the datastore reader 312 may be configured to select the response whose metrics data point includes the most observations. Alternatively, in the case of metrics data comprising maximum and minimum data points, the datastore reader 312 may be configured to compare the responses to determine the maximum and minimum data points and generate a composite response. Once a response has been obtained, the datastore reader 312 may transmit this response to the customer interface 304 for customer use.

Figure 4:
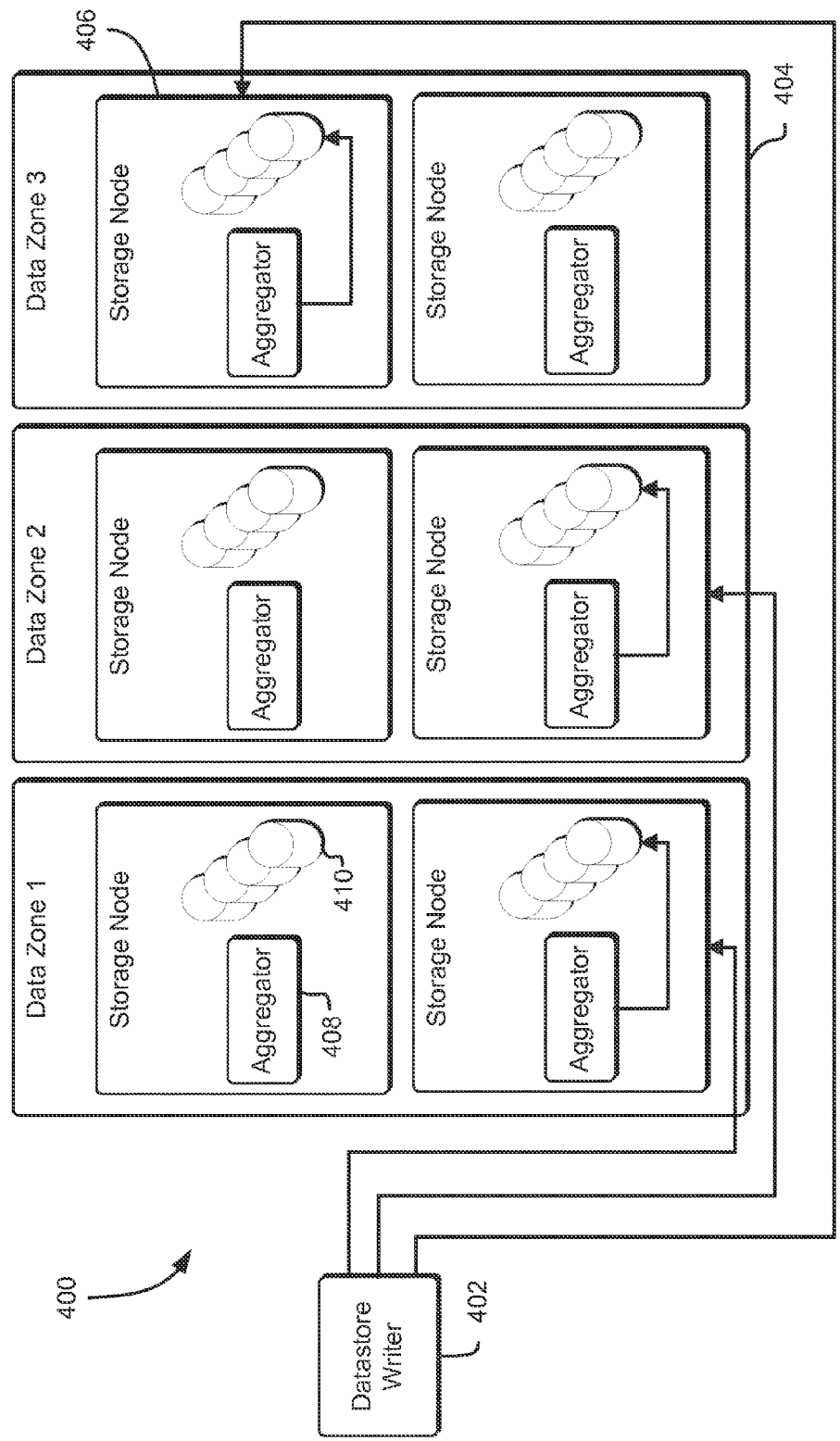
FIG. 4 is an illustrative example of routing data across one or more data zones in accordance with at least one embodiment.

As noted above, the computing resource monitoring service may be configured to process a request to store metrics data by performing a write replication process across one or more distinct data zones. Accordingly, FIG. 4 is an illustrative example of an environment 400 in which metrics data may be routed to one or more storage zones 406 in one or more distinct data zones 404 in accordance with at least one embodiment. As noted above, the replication process may be achieved by mapping one or more logical write operations to multiple physical operations against varying replicas (e.g., data zones 404). In the environment 400, a datastore writer 402 may be configured to select a first data zone 404 to obtain a schedule of storage nodes 406 included in the data zone. The computing resource monitoring service may be configured to maintain a schedule of storage nodes 406 active in the DHT over time. As noted above, the time may be relative to the measure time of observations and not the wall clock time. This schedule of storage nodes 406 may include a time range for which metrics data is to be stored within a storage node 406. Accordingly, the datastore writer 402 may be configured to use this schedule to identify one or more storage nodes 406 within the distinct data zones 404 for storing the metrics data.

Each storage node 406 may include an aggregator 408 which may comprise a hash in order to store the metrics data within the node 406 and associate the metrics data with one or more metric time logical data containers 410 within the storage node 406. As will be described in greater detail in connection with FIG. 8, the datastore writer 402 may be configured to use a fully qualified metric identifier (FQMI), time, and replication factor as a hash key to store the metrics data for each of the metric time logical data containers 410. The FQMI may include a value that comprises a number of statistical aggregations. Thus, the FQMI may go through the aggregator 408 included in the storage node 406. The aggregator 408 may thus be configured to use the FQMI and the metric observation time to select a metric time logical container 410, read the metric time logical data container, update it, and write it back into the storage node 406. The update of the metric time logical data container may include updating an index associated with the metric time logical data container in order to locate the metric stored within the storage node 406.

Figure 5:
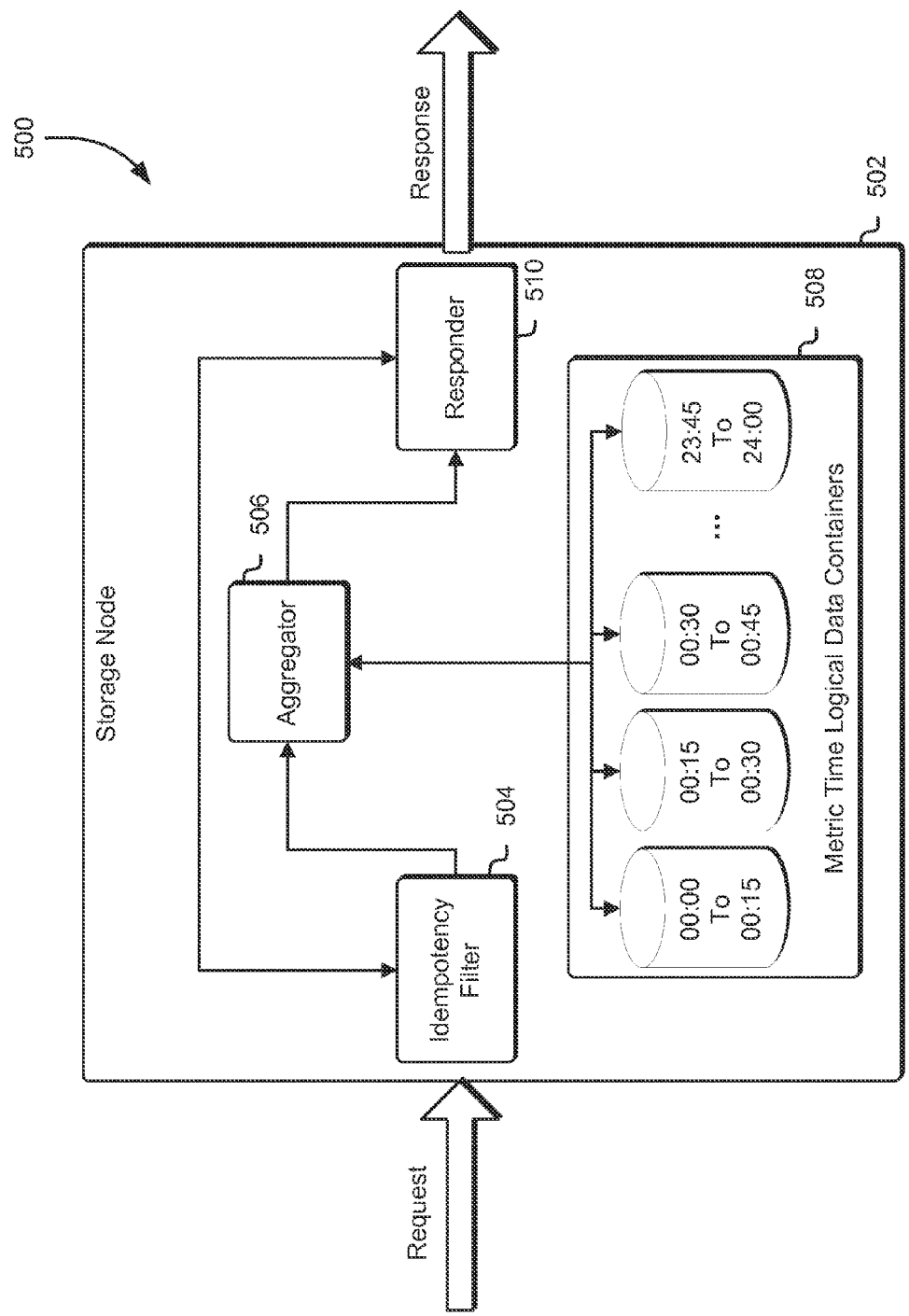
FIG. 5 is an illustrative example of various components that may comprise a storage node in accordance with at least one embodiment.

As noted above, the storage node may comprise a variety of components that may be collectively configured to process a FQMI in order to store metrics data within. Accordingly, FIG. 5 is an illustrative example of various components that may comprise a storage node 502 in accordance with at least one embodiment. Each storage node 502 within the computing resource monitoring service may be configured to be responsible for storing a subset of the key-value entries of the DHT. The storage node 502 may be configured to implement an "aggregate-on-write" behavior at time intervals, as programmed by a computing resource service provider.

In order to handle re-driven messages and/or repeated requests, the storage node 502 may include an idempotency filter 504. The idempotency filter 504 may be configured to process all PUT or GET commands received in order to determine whether the command has been previously processed. For instance, the datastore writer may be configured to transmit an idempotency token along with metrics data provided by a customer to the storage node 502 for storage of the metrics data. Accordingly, the idempotency filter 504 may be configured to examine the incoming idempotency token and compare it with a set of previously seen tokens. The idempotency filter 504 may be configured to transfer the request to a responder 510 should the token match a previously processed token. The idempotency filter 504 may be configured to maintain a "time to live" (TTL) for the previously seen tokens in order to minimize its memory footprint within the storage node 502.

If the idempotency token included in the request does not match a previously processed token, the idempotency filter 504 may transmit the request to an aggregator 506. As noted above, the aggregator 506 may include a hash to store metrics data for each metric time logical data container 508 included in the storage node 502. Accordingly, the FQMIs may be used as a key to the metric time logical data containers 508 within the storage node 502 in order to store the metrics data. The value of the hash may comprise statistical aggregations over a certain time interval. For instance, as illustrated in FIG. 5, each metric time logical data container 508 may correspond to a fifteen minute time interval. The hash value may thus comprise a number of aggregations corresponding to the fifteen minute time interval of the metric time logical data container 508. Thus, a PUT of an observation against a given timestamp may entail reading the hash value in the metric time logical data container 508, updating the hash value, and writing it back to the metric time logical data container 508. Alternatively, a GET of an observation may entail a read of the hash value in the metric time logical data container 508.

Once a PUT or GET command has been processed within the storage node 502, the aggregator 506 may transmit either write acknowledgment or the hash value from the metric time logical data containers 508 (for PUT or GET commands, respectively) to a responder 510. The responder 510 may be configured to transmit these messages to a datastore reader which, in turn, may transmit a response to the customer or a client operating on behalf of the customer.

Figure 6:
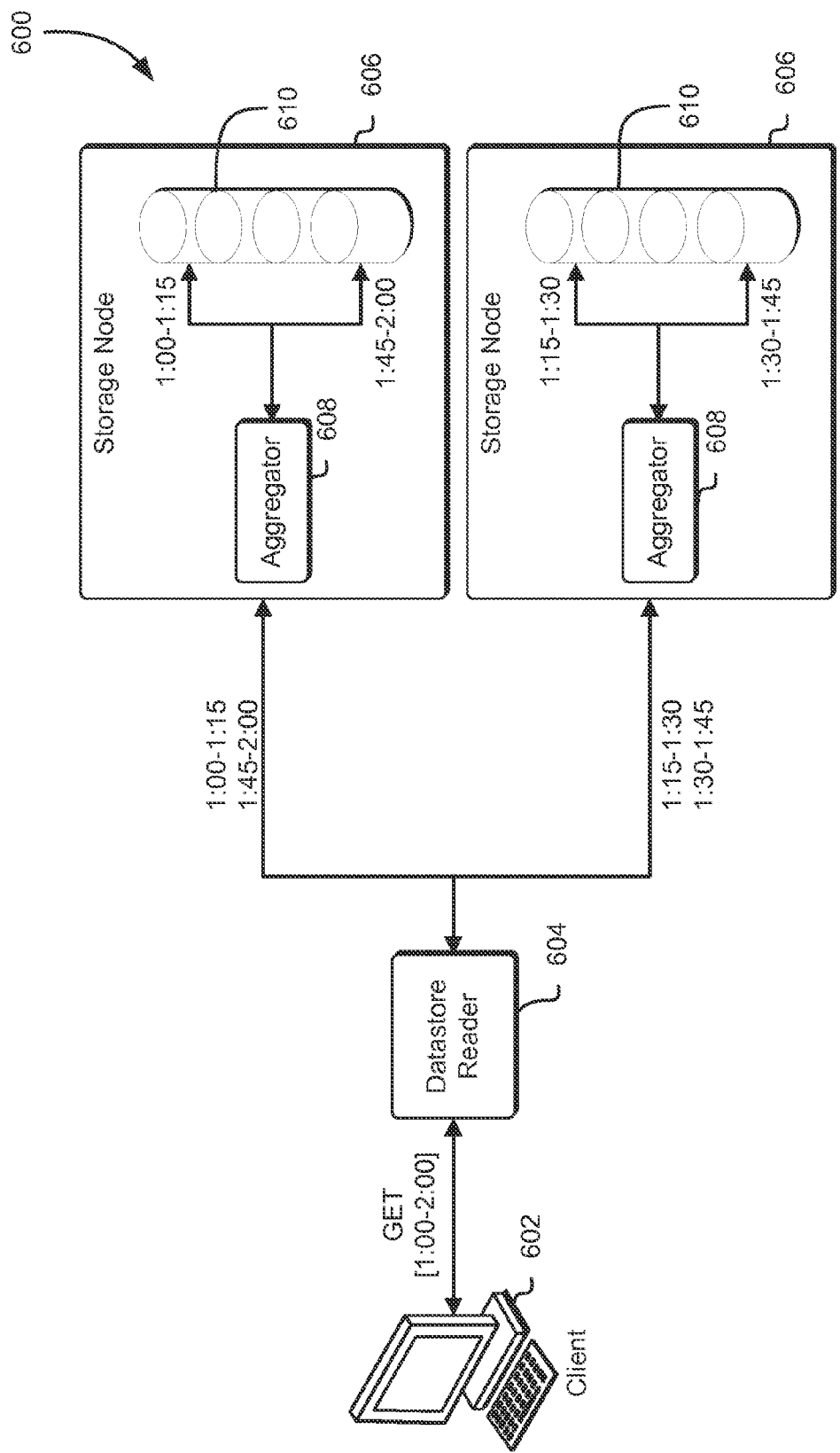
FIG. 6 is an illustrative example of processing a command to read data stored within one or more storage nodes in accordance with at least one embodiment.

As noted above, the computing resource monitoring service may be configured to be a temporally and topologically aware distributed hash table (DHT). Thus, the computing resource monitoring service may be configured to execute PUT or GET commands received from one or more clients operating on behalf of a customer of the computing resource service provider. Accordingly, FIG. 6 is an illustrative example of processing a command to read data stored within one or more storage nodes in accordance with at least one embodiment. In the environment 600, a client 602 may be configured to submit a GET command, such as through appropriately configured API calls to the service, to a datastore reader 604 in order to retrieve certain metrics data from the computing resource monitoring service. As noted above, the GET command may originate from one or more computing resources or customer applications made available to a customer of the computing resource service provider. The GET command may include a hash key which may be used to locate the metrics data.

The hash key included in the GET command may include the FQMI and a time range for the metrics data to be retrieved. For example, as illustrated in FIG. 6, the customer may include in the GET command a one hour interval for which metrics data should be obtained. Accordingly, the datastore reader 604 may be configured to obtain a schedule of storage nodes within a data zone to identify the one or more storage nodes 606 that may comprise the requested metrics data. Based upon the schedule the datastore reader 604 may be configured to only submit the GET command to the active storage nodes 606 in the DHT, while ignoring any nodes that are not part of this schedule. Accordingly, the datastore reader 604 may hash the requested metric for these active storage nodes 606.

The datastore reader 604 may be configured to use the metric hash in order to identify the active storage nodes 606 Thus, the datastore reader 604 may be configured to transmit the GET command to the storage nodes 606 by decomposing the command into sub-commands requesting metrics data corresponding to the time range associated with the storage node 606. For example, as illustrated in FIG. 6, the datastore reader 604 may generate two sub-commands, each with a number of fifteen minute intervals associated with each respective storage node 606. While the use of a fifteen interval is used extensively throughout the present disclosure for the purposes of illustration, the scope of the present disclosure is not so limited. For instance, a computing resource service provider may configure each storage node 606 to aggregate metrics data over other time intervals.

As noted above, each storage node 606 may include an aggregator 608 which may include a hash to store metrics data for each metric time logical data container 610. Additionally, the aggregator 608 may be configured to process a GET command by performing a read of the metric time logical data containers 610 comprising the requested metrics data. Since the metric time logical data containers 610 may be time partitioned, the responses returned to the aggregator may include metrics data for a given time interval. The datastore reader 604 may be configured to apply one or more agreement criteria to the responses to determine whether the response to be provided to the client 602 is accurate. As will be described in greater detail in connection with FIG. 11, if the responses do not meet the agreement criteria, the datastore reader 604 may perform a reconciliation process to generate a response that includes a certain level of accuracy. This response may be transmitted to the client 602 for further use.

Figure 7:
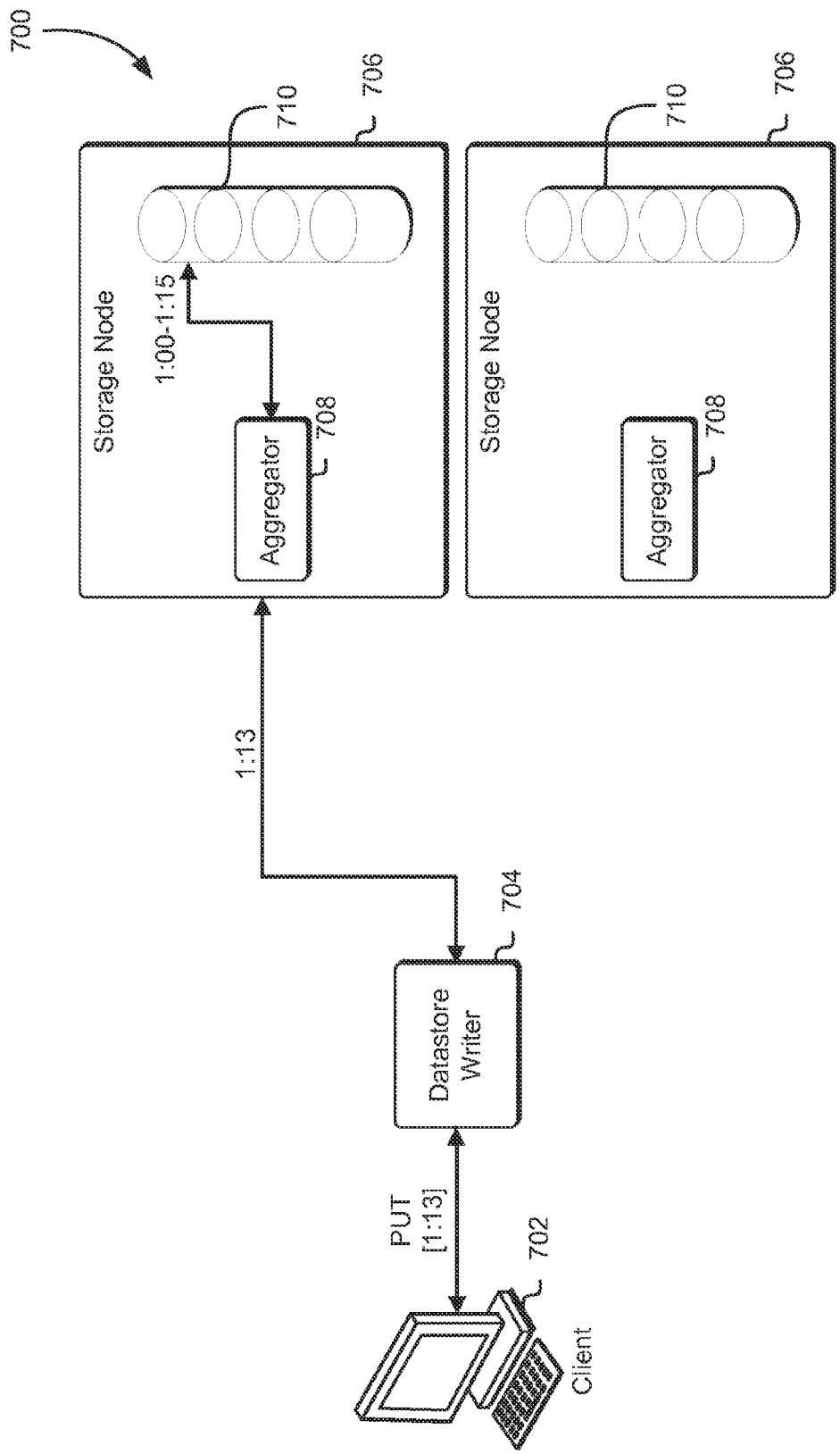
FIG. 7 is an illustrative example of processing a command to store data within one or more storage nodes in accordance with at least one embodiment.

FIG. 7 is an illustrative example of processing a command to store data within one or more storage nodes in accordance with at least one embodiment. In the environment 700, a client 702 may be configured to transmit a PUT command, such as through appropriately configured API calls to the service, to a datastore writer 704 in order to store metrics data. The PUT command may originate from one or more computing resources or customer applications configured to track certain operational metrics (e.g., processor allocation, memory allocation, network performance, etc.) The PUT command may include a hash key comprising a fully qualified metric identifier (FQMI), time and replication factor. Additionally, the PUT command may include the value for a metric at the given time in the hash key. Similar to the datastore reader described above in connection with FIG. 6, the datastore writer 704 may be configured to obtain a schedule of the storage nodes 706 included in the data zone that may be active in the DHT over a certain amount of time. Thus, the datastore writer 704 may be configured to only evaluate these active storage nodes 706 for the proper storage location of the metrics data.

The datastore writer 704 may be configured to hash the metric in order to identify the active node within the data zone that corresponds to the observation timestamp. Accordingly, the metrics data may be processed through an aggregator 708 within the selected active node 706 in order to store the data within a metric time logical data container 710. For instance, the aggregator 708 may be configured to read the hash value from a metric time logical data container 710 and update it based upon the metrics data to be stored therein. Subsequently, the aggregator 708 may write the hash value back into the metric time logical data container 710. In this manner, metrics data may be stored within a storage node 706. This may occur multiple times dependent upon the number of distinct data zones the metrics data is to be replicated to.

Once the metrics data has been written to the metric time logical data container 710 within the active storage node 706, the aggregator 708 may transmit a write acknowledgment to the datastore writer 704. As will be illustrated below in connection with FIG. 8, the datastore writer 704 may be configured to receive write acknowledgment from the active storage nodes 706 in the one or more distinct data zones to ensure successful write replication of the metrics data. Accordingly, if the aggregator 708 does not provide write acknowledgment (e.g., error in writing metrics data to the metric time logical data container 710 or unavailability of the storage node 706), the datastore writer 704 may transmit an error message to the client 702. Alternatively, if the datastore writer 704 has received sufficient write acknowledgments from a plurality of distinct data zones, the datastore writer 704 may transmit a "write success" message to the client 702.

Figure 8:
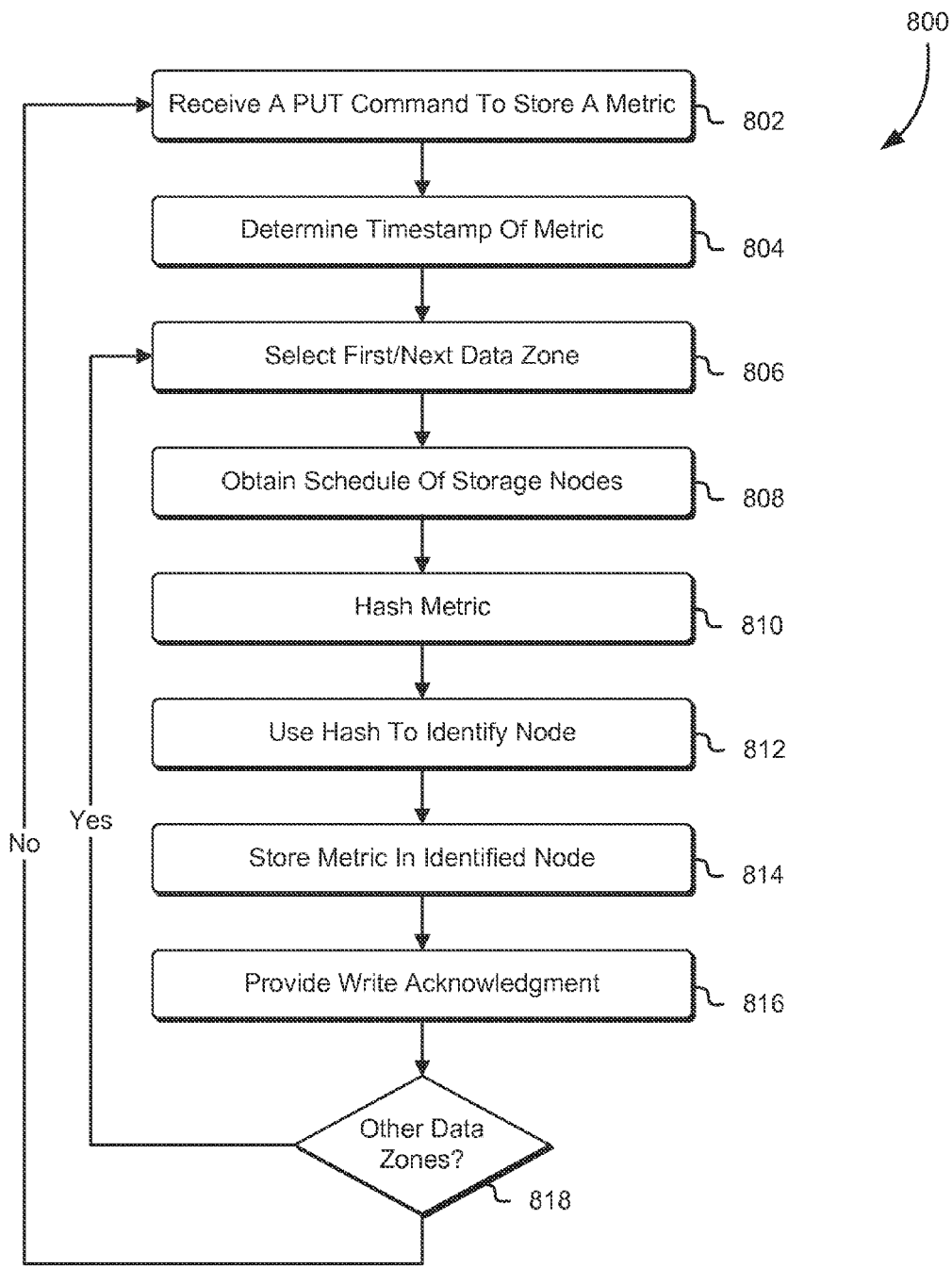
FIG. 8 is an illustrative example of a process for redundantly storing a metric within a storage node in accordance with at least one embodiment.

As illustrated above, the datastore writer may be configured to process a PUT command in order to persistently store metrics data within one or more storage nodes within one or more distinct data zones. Accordingly, FIG. 8 is an illustrative example of a process 800 for redundantly storing a metric within a storage node in accordance with at least one embodiment. The process 800 may include receiving 802 a PUT command to store a metric within the computing resource monitoring service. The PUT command may be received from one or more computing resources or customer applications provided to a customer by a computing resource service provide, such as through one or more appropriately configured API calls to the service. For instance, as illustrated above, a client may be configured to transmit the PUT command to the datastore writer for processing. These API calls may be generated through a customer interface as illustrated in FIG. 3.

As noted above, the computing resource monitoring service may be configured to be a temporally and topologically aware DHT. As such, the values in the hash table may include metrics data aggregated at a specified time interval (e.g., one minute intervals or greater). Keys in this DHT may be composed of the FQMI, time and a replication factor. Accordingly, the PUT command may include the FQMI, time, replication factor and the metrics data value to be stored within the computing resource monitoring service. The datastore writer may be configured to process this PUT command in order to determine 804 the timestamp of the metrics data to be stored. This timestamp may be relative to the measure time of the observations used to generate the metrics data, not the wall clock time. Additionally, the datastore writer may be configured to use the replication factor within the PUT command to locate the distinct data zones that may be used to redundantly store the metrics data.

Based at least in part on the replication factor value, the datastore writer may select 806 a first data zone in order to store the metrics data. For example, the data zones within the computing resource monitoring service may be numbered sequentially (e.g., data zone 0, data zone 1, etc.) such that the replication factor value is equal to the highest value of the data zone (e.g., data zone N, where N is equal to the replication factor value). Thus, the datastore writer may be configured to first select data zone 0. While the present disclosure uses numerical sequences to determine an order for selection of one or more data zones, the present disclosure is not so limited. For instance, the selection of a first data zone may be made randomly or based upon the availability of storage nodes included within the data zones.

The datastore writer may be configured to obtain 808 a schedule of storage nodes within the selected first data zone. As noted above, the computing resource monitoring service may maintain a schedule of storage nodes active in the DHT over time. Accordingly, the datastore writer may be configured to use the timestamp in the PUT command to determine which schedule to use for the selected data zone. For instance, the datastore writer may be configured to select a schedule of storage nodes that encompasses the timestamp from the PUT command. In this fashion, the datastore writer may only need to evaluate the active storage nodes listed in the schedule rather than all storage nodes within the data zone. Thus, for a PUT of a metric at a given time, the same schedule of storage nodes may always be in effect, obviating the need to re-hash or migrate data when a new storage node is introduced.

Once the datastore writer has obtained the schedule of storage nodes within the data zone, the datastore writer may proceed to apply a hash function in order to hash 810 the metric. This may enable the datastore writer to further use 812 the hash of the metric to identify which storage node within the data zone should be used to store the metrics data. Accordingly, the datastore writer may be configured to transmit the PUT command to the target storage node.

As noted above, each storage node may include an aggregator which may be configured to store metrics data for each metric time logical data container within the storage node. Thus, the aggregator may be configured to obtain the PUT command and store 814 the metrics data in a metric time logical data container within the storage node. The aggregator may be configured to use the FQMI in the PUT command as a key to the appropriate metric time logical data container. Accordingly, the aggregator may be configured to obtain the hash value from the metric time logical data container and update it based at least in part on the metrics data included in the PUT command. Subsequently, the aggregator may restore the updated hash value, now comprising the new metrics data, in the metric time logical data container.

The aggregator may be configured to provide 816 write acknowledgment if the aggregator was successful in storing the metric in the storage node. The aggregator may be configured to transmit this write acknowledgment to the datastore writer which, in turn, may use this acknowledgment to determine whether the PUT command was successfully processed. However, if the storage node is unavailable or there is an error in processing the PUT command in the storage node, there may not be write acknowledgment and this step in the process 800 may be skipped.

Once the datastore writer has received write acknowledgment from the aggregator, no write acknowledgment has been received after a certain amount of time or an error has been received, the datastore writer may retain the status of the PUT command with regard to the data zone. Subsequently, the datastore writer may determine 818 whether there are any other data zones for which to store the metrics data. Again, in order to determine if other data zones are to be used to redundantly store the metrics data, the datastore writer may be configured to evaluate the replication factor in the PUT command to determine how many distinct data zones are to be used. Thus, the datastore writer may be configured to initiate the process 800 equal to the value of the replication factor in the PUT command.

As noted above, the aggregator in each storage node may be configured to provide write acknowledgment to the datastore writer in the event of successful storage of metrics data in the storage node. Accordingly, the datastore writer may be configured to determine whether there are sufficient write acknowledgments to deem the PUT command as having been successfully processed. For example, the datastore writer may be configured to transmit a "write success" message to the customer interface if it has obtained at least two out of three write acknowledgments from the targeted storage nodes within the distinct data zones. Alternatively, if fewer than two out of three write acknowledgments are received, the datastore writer may transmit an error message to the customer interface. This may inform the customer that he/she may need to transmit a new PUT command at a later time to ensure write replication.

Figure 9:
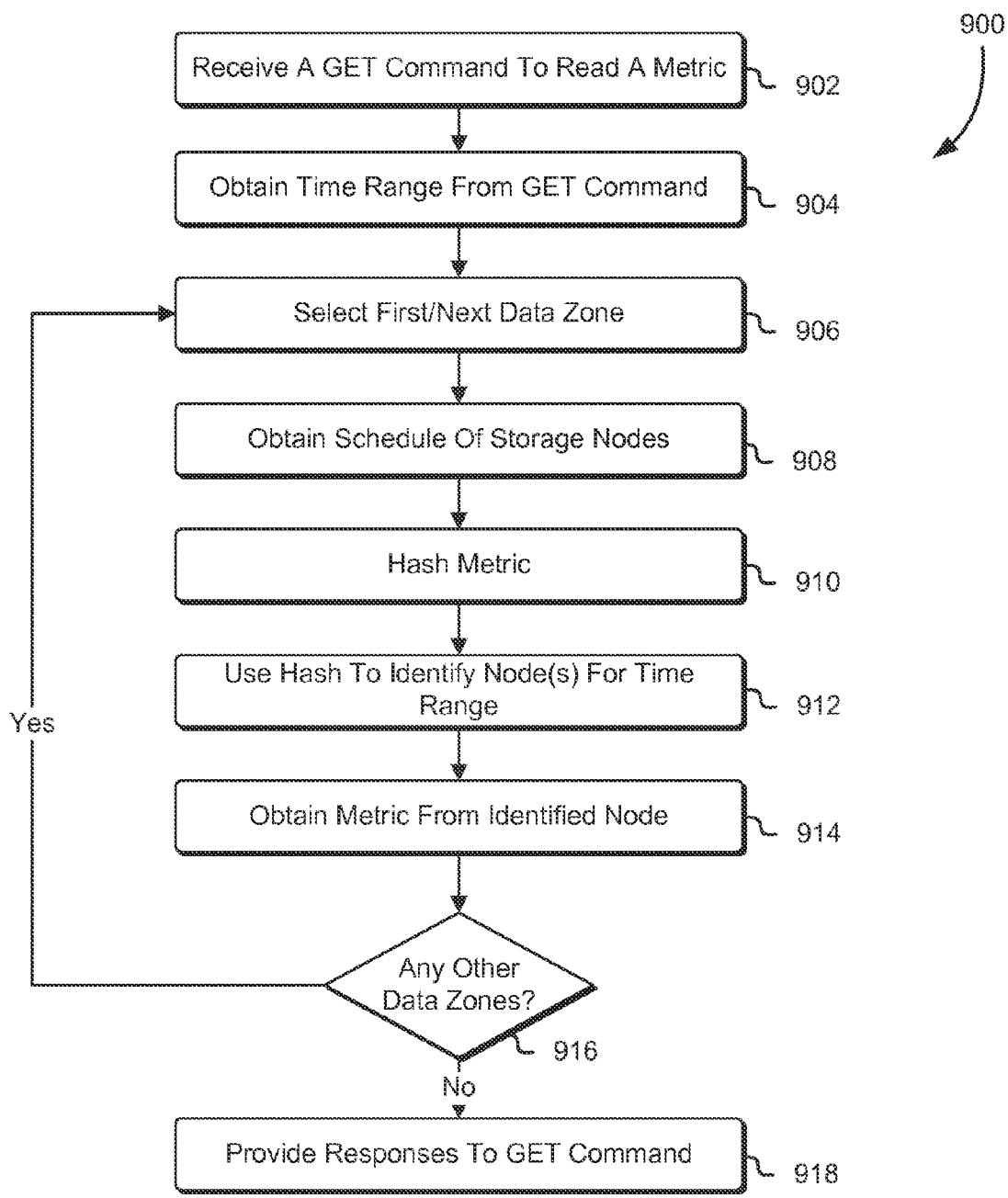
FIG. 9 is an illustrative example of a process for providing one or more responses in order to fulfill a query for a metric in accordance with at least one embodiment.

As noted above, the computing resource monitoring service may be configured to additionally process one or more GET commands to obtain metrics data to fulfill a customer query. Accordingly, FIG. 9 is an illustrative example of a process 900 for providing one or more responses in order to fulfill a query for a metric in accordance with at least one embodiment. The process 900 may be performed by a datastore reader configured to receive 902 a GET command from a client to read a metric stored within the computing resource service provider. This command may be received from a client operated by a customer of the computing resource service provider, which may be hosted by the customer itself, by the computing resource service provider or by another entity, such as through one or more appropriately configured API calls to the service. These API calls may be generated through a customer interface as illustrated in FIG. 3. As noted above, keys in the DHT may comprise a FQMI, time and replication factor. Accordingly, the GET command may include the FQMI and a metric time interval necessary to obtain the metrics data.

As opposed to a PUT command, the GET command may comprise a time range for metrics data that is requested by the customer or client operating on behalf of the customer. Accordingly, the datastore reader may be configured to obtain 904 the time range from the GET command. This time range may be relative to the measure time of the observations used to generate the metrics data, not the wall clock time. Additionally, the datastore reader may be configured to use the replication factor within the GET command to locate the distinct data zones that may include the requested metrics data.

Similar to the process illustrated in FIG. 8, the process 900 may include selecting 906 a first data zone. A number of different methods may be used to properly select a first data zone from a plurality of data zones made available for the computing resource monitoring service. For instance, an identifier within the GET command may be used to identify which data zones are used to store the metrics. Alternatively, the computing resource monitoring service may include a database that enables identification of which data zones contain metrics responsive to the query. The database may, for instance, indicate which data zones a customer uses, which data zones the customer users to store metrics, which metrics stored within each data zone, and/or otherwise. In this alternate example, the FQMI included in the GET command and/or other information may be used to locate the metric within the database and the associated data zones The datastore reader may be configured to obtain 908 a schedule of storage nodes within the selected first data zone. As noted above, the computing resource monitoring service may maintain a schedule of storage nodes active in the DHT over time. Accordingly, the datastore reader may be configured to use the time range in the GET command to determine which schedule to use for the selected data zone. For instance, the datastore reader may be configured to select a schedule of storage nodes that encompasses the time range from the GET command. In this fashion, the datastore reader may only need to evaluate the active storage nodes listed in the schedule rather than all storage nodes within the data zone. Thus, for a GET of a metric at a given time range, the same schedule of storage nodes may always be in effect.

Once the datastore reader has obtained the schedule of storage nodes within the selected first data zone, the datastore reader may apply a hash function to the FQMI in the hash key in order to hash 910 the metric. This may enable the datastore reader to further use 912 the hash of the metric to identify which storage nodes need to be accessed in order to retrieve the requested metrics data. Accordingly, the datastore reader may be configured to transmit the GET command to these target storage nodes.

As noted above, each storage node within a distinct data zone may comprise metrics data for a given time range of observations. Thus, these storage nodes may not correspond to overlapping time ranges within the distinct data zone. Accordingly, the datastore reader may be configured to refer to more than one storage node within a distinct data zone, dependent on the time range provided in the GET command. Thus, the process 900 may include having the datastore reader obtain 914 the metric from the one or more identified nodes. As noted above, each storage node may include an aggregator that may be configured to store metrics data in one or more metric time logical data containers within the node. Each metric time logical data container may comprise metrics data for a given time range; this time range may be a subset of the storage node overarching time range for storage of metrics data. Thus, the combination of all metric time logical data containers within the storage node may collectively comprise metrics data for the overarching time range. A GET of a metric within a storage node may comprise a read of the necessary metric time logical data containers to obtain the metrics data. Accordingly, the aggregator may aggregate the metrics data from the one or more metric time logical data containers and provide this response to the datastore reader. The response may be combined with all other responses received from the storage nodes within the distinct data zone.

Once the datastore reader has obtained a response to the GET command from the first selected data zone, the datastore reader may determine 916 whether there are any other distinct data zones remaining based at least in part on the replication factor in the GET command. If there are other distinct data zones that need to be accessed in order to obtain metrics data, the datastore reader may again select 906 one of the remaining data zones and obtain 908 the schedule of storage nodes from this newly selected data zone to obtain a GET command response from the data zone.

The datastore reader may be configured to apply agreement criteria to the responses to the GET command received from the distinct data zones. If the responses satisfy the agreement criteria set forth, the datastore reader may transmit the responses to a customer interface. The customer interface may be configured to provide 918 the responses to the GET command to the customer or client operating on behalf of the customer for further use in support of the customer's business. However, if the responses do not satisfy the agreement criteria, the datastore reader may perform a reconciliation process to generate a reconciled response through the use of one or more heuristics. The heuristics, as will be illustrated below, may be selected based at least in part on the type of metric requested. This reconciled response may be provided to the customer in response to the GET command.

Figure 10:
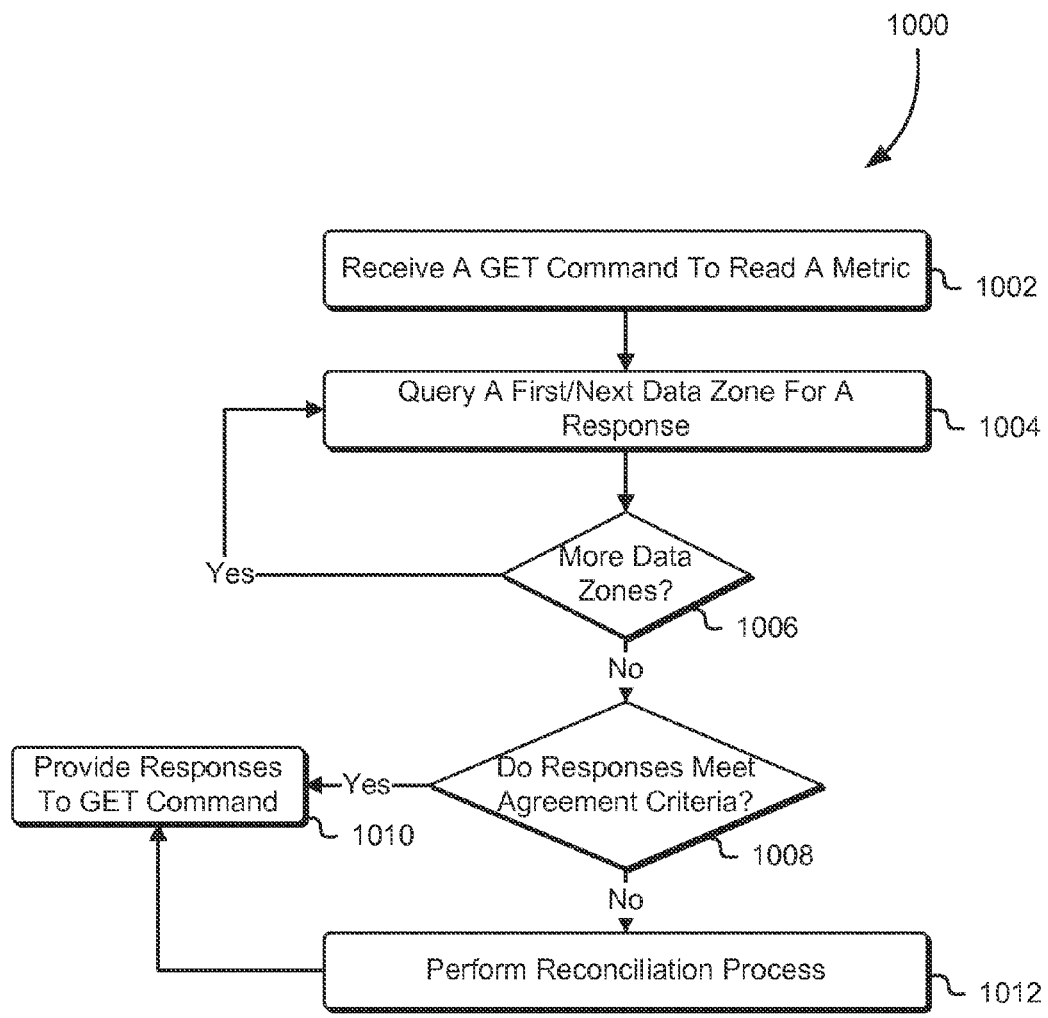
FIG. 10 is an illustrative example of a process for determining whether to perform a reconciliation process as a result of one or more responses in accordance with at least one embodiment.

In the event of a storage node or data zone failure or unavailability, the datastore reader may not receive certain responses or may receive responses with erroneous metrics data. Accordingly, FIG. 10 is an illustrative example of a process 1000 for determining whether to perform a reconciliation process as a result of one or more responses in accordance with at least one embodiment. The process 1000 may be performed by a plurality of components comprising a computing resource monitoring service interacting with one or more storage nodes within one or more data zones. In the process 1000, a datastore reader may be configured to receive 1002 a GET command from a client, as noted above, to read a metric from one or more distinct data zones. As noted above, the GET command may include a hash key which may comprise the FQMI, time range and replication factor. The replication factor may be used to determine which data zones may be accessed to obtain the metrics data.

Accordingly, the datastore reader may be configured to query 1004 a first data zone for a response to the GET command. As in the process illustrated above in FIG. 9, the datastore reader may be configured to perform this initial query based at least in part on an identifier in the GET command that may be used to locate the one or more data zones wherein the requested metric is stored or a database that indicates where metrics are stored for the customer. Once a first data zone has been selected, the datastore reader may be configured to use a schedule of storage nodes within the data zone to access the active storage nodes for the given time range, obtain the metric from the active nodes based at least in part on a hash of the metric and provide a response to the GET command.

Once the datastore reader has obtained a response from the first data zone or the query has timed out (e.g., unavailable storage node within the data zone or unavailable data zone), the datastore reader may determine 1006 whether there are any more data zones that may be queried. If there are more data zones (as determined using the identifier in the GET command and the database comprising data zones wherein the requested metric is stored), the datastore reader may query 1004 the next data zone for a response. Accordingly, the datastore reader may obtain responses (or lack thereof) from the remaining data zones.

If the datastore reader has queried all available data zones, the datastore reader may process the responses to determine 1008 whether the responses meet one or more agreement criteria. As noted above, the datastore reader may be configured to apply one or more heuristics to determine agreement. For example, the datastore reader may be configured to compare sample counts for the metric between the multiple responses to determine if there is agreement between the responses. Thus, if a certain percentage of the responses are consistent with each other, the responses may be deemed to meet the agreement criteria. While sample count comparisons are used within the present disclosure for the purpose of illustration, the present disclosure is not so limited. For instance, the agreement criteria may include comparing metrics data values within the responses (e.g., averages, minimum, maximum, percentiles, etc.) to determine whether the values are within a certain margin of error. Alternatively, the datastore reader may be configured to determine whether the response set includes identical data from each data zone queried based on a condition (e.g., agreement criteria).

If the responses meet the agreement criteria, the datastore reader may transmit the responses to the customer interface, which may be configured to provide 1010 these responses to the customer to fulfill the GET command. Alternatively, if the responses do not meet the agreement criteria, the datastore reader may perform 1012 a reconciliation process to generate what may be the most accurate response to the GET command. For instance, as will be illustrated in connection with FIGS. 11 and 12, the datastore reader may be configured to apply one or more heuristics to the responses in order to generate a reconciled response to the GET command. This reconciled response may provide a greater degree of accuracy as opposed to the original received responses.

Figure 11:
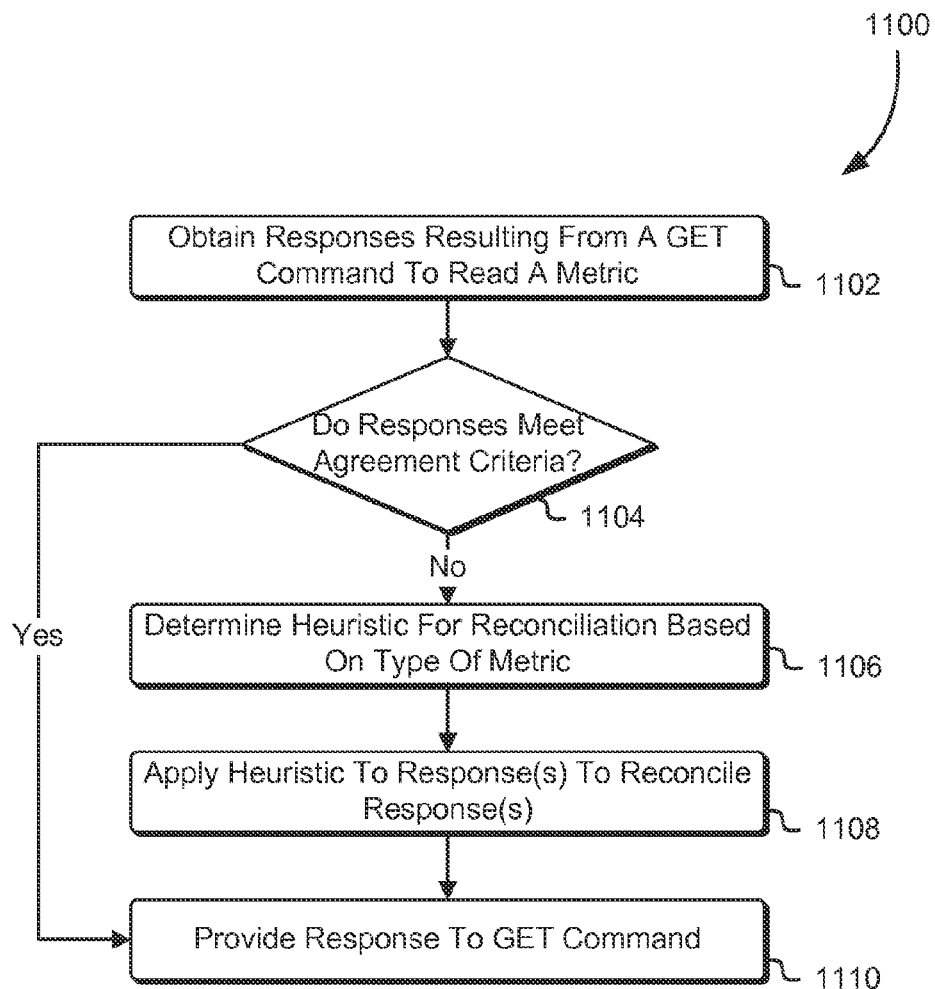
FIG. 11 is an illustrative example of a process for reconciling responses based upon one or more heuristics in accordance with at least one embodiment.

As noted above, if the received responses to a GET command do not meet one or more agreement criteria, the datastore reader may perform a reconciliation process to generate a response. Accordingly, FIG. 11 is an illustrative example of a process 1100 for reconciling responses based upon one or more heuristics in accordance with at least one embodiment. The process 1100 may include obtaining 1102 one or more responses from one or more distinct replicas (e.g., data zones) as a result of a processed GET command to these replicas. This step in the process 1100 may be performed using a datastore reader configured to transmit a GET command to one or more distinct replicas and receive responses from these replicas. The datastore reader may additionally be configured to process any timed out or unavailability errors for a given replica if no response is received from a particular replica.

As illustrated above, the datastore reader may be configured to determine 1104 whether the received responses to the GET command meet one or more agreement criteria. Again, the agreement criteria may include applying one or more heuristics for agreement to the responses, such as a comparison of sample counts amongst the various responses to determine if there is a match between a certain number or percentage of the responses. Alternatively, for certain metrics, the datastore reader may be configured to use an "any response" strategy, such that the responses do not need to match the agreement criteria. If the responses to the GET command satisfy the agreement criteria, the datastore reader may transfer the responses to the customer interface in order to fulfill the GET command submitted by the customer. Accordingly, the customer may use the responses for the customer's business needs.

If the responses fail to satisfy the agreement criteria, the datastore reader may determine 1106 which set of heuristics may be used, based at least in part on the type of metric, to perform the reconciliation process. As noted above, values in the distributed hash table (DHT) may include metric statistics (e.g., data) which may include average, minimum, maximum, sample count, percentiles and other statistical measures. Thus, if observations for a given metric include aggregated averages, for example, the datastore reader may utilize a heuristic that includes utilizing the average and sample count for each response received to create a response that includes a weighted average for the metric in addition to a standard deviation that may be relevant to this response. Alternatively, if the observations for a given metric include a maximum or minimum value, the datastore reader may utilize a heuristic that includes comparing the responses to obtain a maximum and minimum value and generate a composite response. It should be noted that the present disclosure is to include any variations of metrics data and appropriate heuristics that may be used to generate a reconciled response based at least in part on the metrics data.

The datastore reader may be configured to apply 1108 the heuristics to the set of responses received in order to generate a reconciled response. As noted above, the heuristics used may be dependent upon the type of metric data being obtained. Thus, the datastore reader may be configured to perform one or more operations related to the received responses based at least in part on the heuristics selected. Accordingly, the datastore reader may generate one or more reconciled responses that, based at least in part on the heuristics applied to the responses received from the one or more replicas, may provide a more accurate response to the GET command. The datastore reader may be configured to provide 1110 this reconciled response to the GET command to a customer interface for use by the customer.

Figure 12:
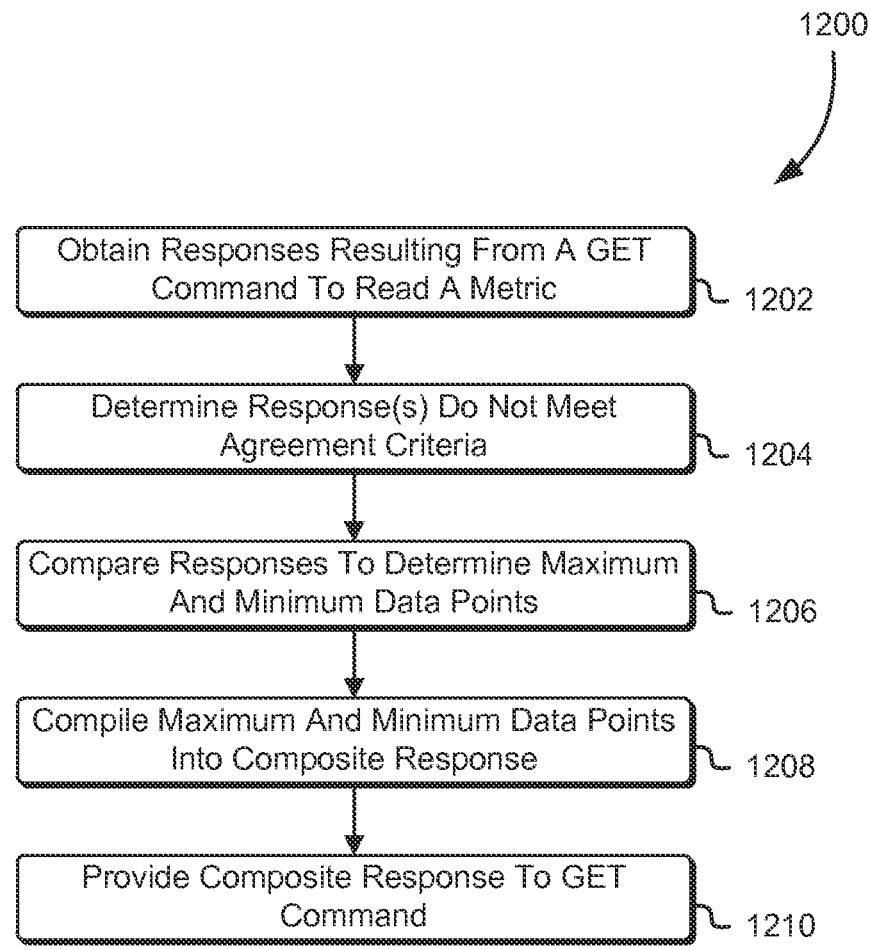
FIG. 12 is an illustrative example of a process for compiling a composite response based on one or more responses to a query in accordance with at least one embodiment.

As noted above, the datastore reader may be configured to determine a set of heuristics to be applied to the one or more responses from the distinct replicas based at least in part on the type of metric. Accordingly, FIG. 12 is an illustrative example of a process 1200 for compiling a composite response based on one or more responses to a query in accordance with at least one embodiment. The process 1200 may include a datastore reader configured to obtain 1202 one or more responses from one or more distinct replicas resulting from a GET command transmitted to these replicas. As noted above, the datastore reader may not receive a response from an unavailable replica or unavailable storage node within a replica. Thus, the datastore reader may be configured to treat this lack of a response as a replicated read that fails to meet the agreement criteria.

Accordingly, the datastore reader may be configured to apply agreement criteria to the responses or lack thereof to determine whether the received responses meet the criteria. Thus, in order to apply a reconciliation process to the responses, the datastore reader must determine 1204 that the responses (or lack thereof) do not meet the agreement criteria. As noted above, the reconciliation process may include selecting and applying one or more heuristics based at least in part on the type of metric for which responses are being gathered. For instance, in this illustrative example, the observations associated with the metric may include maximum and minimum data points. Accordingly, the datastore reader may be configured to apply a heuristic that performs the reconciliation process according to the maximum and minimum data points.

Thus, in this illustrative example, the datastore reader may be configured to apply a heuristic that causes it to compare 1206 the responses received (or lack thereof) from the one or more distinct replicas to determine maximum and minimum end points. For instance, the datastore reader may be configured to analyze a first response in order to obtain a maximum and a minimum data point. Accordingly, these data points may be stored in memory for the purpose of comparison. Thus, when the datastore reader evaluates a second response, the datastore reader may obtain the maximum and minimum data points from this second response and compare these data points to the stored data points. If the any of the data points from the second response provide a new maximum or minimum data point, the datastore reader may replace the existing maximum or minimum from memory and store the new maximum or minimum in its place. In this fashion, the datastore reader may determine the maximum and minimum data points from all the responses.

The datastore reader may be configured to compile 1208 the maximum and minimum data points to generate a composite response, based upon the received responses from the distinct replicas. This compiled response may include the absolute maximum and minimum data points, which may provide a more likely accurate response. Accordingly, the datastore reader may be configured to transmit this composite response to a customer interface which, in turn, may provide 1210 the composite response to the customer for further use.

Figure 13:
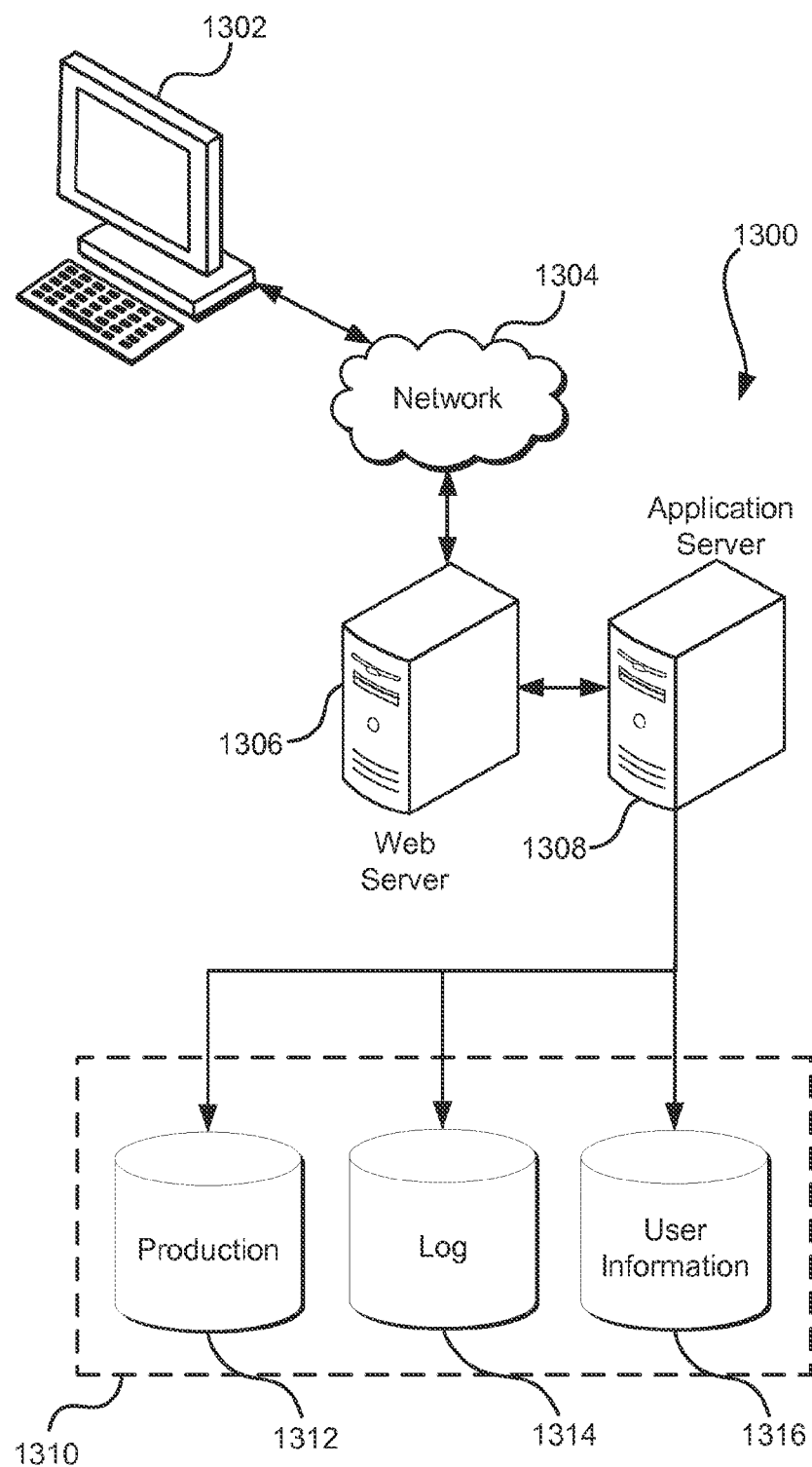
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a datastore 1310. It should be understood that there can be several application servers, layers or other elements, processes or components, which may be chained or otherwise configured, which can interact to perform tasks such as obtaining data from an appropriate datastore. Servers, as used herein, may be implemented in various ways, such as hardware devices or virtual computer systems. In some contexts, servers may refer to a programming module being executed on a computer system. As used herein the term "datastore" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the datastore as needed to execute aspects of one or more applications for the client device, handling some (even a majority) of the data access and business logic for an application. The application server may provide access control services in cooperation with the datastore and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1302 and the application server 1308, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The datastore 1310 can include several separate data tables, databases or other data storage mechanisms and media for storing data relating to a particular aspect of the present disclosure. For example, the datastore illustrated may include mechanisms for storing production data 1312 and user information 1316, which can be used to serve content for the production side. The datastore also is shown to include a mechanism for storing log data 1314, which can be used for reporting, analysis or other such purposes. It should be understood that there can be many other aspects that may need to be stored in the datastore, such as page image information and access rights information, which can be stored in any of the above listed mechanisms as appropriate or in additional mechanisms in the datastore 1310. The datastore 1310 is operable, through logic associated therewith, to receive instructions from the application server 1308 and obtain, update or otherwise process data in response thereto. In one example, a user, through a device operated by the user, might submit a search request for a certain type of item. In this case, the datastore might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of datastores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for redundantly storing metrics data, comprising:
   under the control of one or more computer systems configured with executable instructions,
   receiving an application programming interface command to: store a metric, the application programming interface command comprising a metric identifier for the metric, a time at which the metric was measured, a measurement value for the metric; and
   for each data zone of a plurality of data zones:
   obtaining, based at least in part on the time at which the metric was measured, a schedule of storage nodes of the data zone, the schedule encompassing the time at which the metric was measured and associating a plurality of storage nodes of the data zones with corresponding time intervals, the schedule being further configured such that each time interval of the time intervals partially but incompletely overlaps with at least one time interval for another storage node according to another schedule for another data zone in which the other storage node is located;
   selecting a storage node from the plurality of storage nodes of the data zone based at least in part on the metric identifier, the time, and the obtained schedule; and
   storing the measurement value in the selected storage node.

2. The computer-implemented method of claim 1, wherein the application programming interface command further comprises a replication factor, the replication factor indicating the plurality of data zones for storing the measurement value for the metric causing the one or more computer systems to select the plurality of data zones in accordance with the replication factor.

3. The computer-implemented method of claim 1, wherein:
   the storage nodes comprise one or more metric time logical data containers, the one or more metric time logical data containers each corresponding to a different distinct time interval for the storage node; and
   storing the measurement value includes associating the measurement value with a metric time logical data container of the one or more metric time logical data containers based at least in part on a time interval for the measurement value corresponding to the selected storage node.

4. The computer-implemented method of claim 1, wherein each storage node of the storage nodes each comprises an idempotency filter that causes the storage node to prevent duplication of the measurement value stored within the selected storage node.

5. The computer-implemented method of claim 1, further comprising:
   receiving write acknowledgment from the selected storage node if the measurement value is stored successfully within the selected storage node; and
   transmitting a confirmation to the one or more computer systems if write acknowledgment is received from a specified minimum number of selected storage nodes from the plurality of data zones.

6. The computer-implemented method of claim 1, wherein selecting the storage node includes hashing the metric identifier in order to identify the storage node from the plurality of storage nodes in the data zone.

7. The computer-implemented method of claim 1, wherein storing the measurement value includes reading a metric time logical data container value, updating the metric time logical data container value based at least in part on the metric identifier and the time, and writing the metric time logical data container value back into the metric time logical data container.

8. The computer-implemented method of claim 1, wherein:
   each data zone of the plurality of data zones includes one or more schedules of storage nodes of the data zone; and
   obtaining a schedule of storage nodes of the data zone from the one or more schedules of storage nodes of the data zones is based at least in part on the time at which the metric was measured.

9. A computing resource monitoring system, comprising:
   one or more processors; and
   memory including instructions that, when executed by the one or more processors, cause the computing resource monitoring system to implement:
   a customer interface that receives one or more application programming interface commands for storage of a metric, the application programming interface commands comprising one or more metric attributes associated with the metric; and
   a datastore writer that, for each data zone of a plurality of data zones, processes a command to redundantly store a metric by at least:
   obtaining, based at least in part on the one or more metric attributes, a schedule of storage nodes of the data zone, the schedule encompassing at least one metric attribute of the one or more metric attributes and associating each storage node of a plurality of storage nodes of the data zones with a corresponding metric attribute of the one or more metric attributes;
   selecting a storage node from the plurality of storage nodes of the data zone based at least in part on the one or more metric attributes and the obtained schedule; and
   storing the metric in the selected storage node.

10. The computing resource monitoring system of claim 9, wherein the one or more metric attributes includes a metric identifier for the metric and an observation time for when the metric was observed.

11. The computing resource monitoring system of claim 9, wherein a first schedule for a first data zone of the plurality of data zones and a second schedule for a second data zone of the plurality of data zones are collectively configured such that, for a particular metric:

for a first time interval, the particular metric is stored in a first storage node of the first data zone and in a second storage node of the second data zone; and for a second time interval, the particular metric is stored in the first storage node of the first data zone and in a third storage node of the second data zone.

12. The computing resource monitoring system of claim 9, wherein:

the storage nodes comprise one or more logical data containers each corresponding to a different distinct value for the metric attribute; and storing the metric includes associating the metric with a logical data container of the one or more logical data containers based at least in part on a metric attribute for the metric.

13. The computing resource monitoring system of claim 9, wherein the application programming interface command includes a replication factor, the replication factor indicating the plurality of data zones for storing the metric causing the one or more computer systems to select the plurality of data zones in accordance with the replication factor.

14. The computing resource monitoring system of claim 9, wherein selecting the storage node includes hashing a metric attribute of the one or more metric attributes in order to identify the storage node from the plurality of storage nodes in the data zone.

15. The computing resource monitoring system of claim 9, wherein:

each data zone of the plurality of data zones includes one or more schedules of storage nodes of the data zone; and obtaining a schedule of storage nodes of the data zone from the one or more schedules of storage nodes of the data zones is based at least in part on at least one metric attribute of the one or more metric attributes.

16. The computing resource monitoring system of claim 9, wherein each storage node of the plurality of storage nodes each comprises an idempotency filter that prevents duplication of the metric stored within the selected storage node.

17. One or more non-transitory computer-readable storage media having collectively stored therein instruction that, when executed by one or more processors of a computing resource monitoring system, cause the computing resource monitoring system to:

process an application programming interface command to store a metric, the application programming interface command comprising one or more metric attributes; and for each data zone of a plurality of data zones, process a command to redundantly store a metric by at least:

obtaining, based at least in part on the one or more metric attributes, a schedule of storage nodes of the data zone, the schedule encompassing at least one metric attribute of the one or more metric attributes and associating each storage node of a plurality of storage nodes of the data zones with a corresponding metric attribute of the one or more metric attributes;

selecting a storage node from the plurality of storage nodes of the data zone based at least in part on the one or more metric attributes and the obtained schedule; and storing the metric in the selected storage node.

18. The one or more non-transitory computer-readable storage media of claim 17, wherein:

a first schedule for a first data zone of the plurality of data zones and a second schedule for a second data zone of the plurality of data zones are collectively configured such that, for a particular metric:

for a first time interval, the particular metric is stored in a first storage node of the first data zone and in a second storage node of the second data zone; and for a second time interval, the particular metric is stored in the first storage node of the first data zone and in a third storage node of the second data zone.

19. The one or more non-transitory computer-readable storage media of claim 17, wherein:

the storage nodes comprise one or more logical data containers each corresponding to a different distinct value for the metric attribute; and storing the metric includes associating the metric with a logical data container of the one or more logical data containers based at least in part on a metric attribute for the metric.

20. The one or more non-transitory computer-readable storage media of claim 17, wherein the one or more metric attributes includes a fully qualifies metric identifier for identifying a metric to be stored, a metric time relative to the measure time of an observation of the metric and a metric observation value.

21. The one or more non-transitory computer-readable storage media of claim 17, wherein the application programming interface command further comprises a replication factor that is used to select the plurality of data zones for storing the metric.

22. The one or more non-transitory computer-readable storage media of claim 17, wherein each storage node from the plurality of storage nodes includes an idempotency filter and a responder component, the idempotency filter that prevents duplication of the metric within the storage node and transmits a stored response to the application programming interface command to the responder.

23. The one or more non-transitory computer-readable storage media of claim 17, wherein selecting the storage node includes hashing a metric attribute of the one or more metric attributes in order to, identify the storage node from the plurality of storage nodes in the data zone.

24. The one or more non-transitory computer-readable storage media of claim 17, wherein storing the metric includes reading a value from within the storage node, updating the value based at least in part on the one or more metric attributes, and writing the value back into the storage node.

25. The one or more non-transitory computer-readable storage media of claim 17, wherein:

each data zone of the plurality of data zones includes one or more schedules of storage nodes of the data zone; and obtaining a schedule of storage nodes of the data zone from the one or more schedules of storage nodes of the data zones includes selecting a schedule of storage nodes from the plurality of data zones based at least in part on at least one metric attribute of the one or more metric attributes.

* * * * *